(12) United States Patent
Nishikawa et al.

(10) Patent No.: US 6,590,318 B2
(45) Date of Patent: Jul. 8, 2003

(54) SPARK PLUG HAVING A REDUCED LEAD GLAZE LAYER ON THE INSULATOR THEREOF

(75) Inventors: Kenichi Nishikawa, Bisai (JP); Makoto Sugimoto, Nagoya (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 56 days.

(21) Appl. No.: 09/794,151

(22) Filed: Feb. 28, 2001

(65) Prior Publication Data

US 2002/0033659 A1 Mar. 21, 2002

(51) Int. Cl.[7] .............................................. H01T 13/20
(52) U.S. Cl. ....................................................... 313/143
(58) Field of Search ................................. 313/118, 143; 501/14

(56) References Cited

U.S. PATENT DOCUMENTS

| | | | | |
|---|---|---|---|---|
| 4,084,976 A | * | 4/1978 | Hinton | 501/26 |
| 4,120,733 A | * | 10/1978 | Knapp | 501/26 |
| 4,256,497 A | * | 3/1981 | Knapp | 501/21 |
| 5,283,134 A | * | 2/1994 | Sugimoto et al. | 428/698 |
| 5,518,968 A | * | 5/1996 | Knapp | 501/14 |
| 5,677,250 A | * | 10/1997 | Knapp | 501/14 |
| 5,760,533 A | * | 6/1998 | Saiki et al. | 313/137 |
| 5,859,491 A | | 1/1999 | Nishikawa et al. | |
| 5,985,473 A | * | 11/1999 | Knapp | 428/702 |
| 6,160,342 A | * | 12/2000 | Nishikawa et al. | 313/141 |
| 6,166,481 A | * | 12/2000 | Knapp et al. | 313/141 |
| 6,274,971 B1 | * | 8/2001 | Sugimoto et al. | 313/143 |

FOREIGN PATENT DOCUMENTS

| | | |
|---|---|---|
| JP | 10-236845 | 9/1998 |
| JP | 11-43351 | 2/1999 |
| JP | 11-106234 | 4/1999 |
| JP | 0 959 542 A1 | 11/1999 |

* cited by examiner

Primary Examiner—Sandra O'Shea
Assistant Examiner—Dalei Dong
(74) Attorney, Agent, or Firm—Morgan, Lewis & Bockius LLP

(57) ABSTRACT

A spark plug having a glaze layer on the insulator thereof, wherein the glaze layer has a reduced Pb content, is capable of being fired at a relatively low temperature, exhibits excellent insulation properties, and can have a smooth surface.

29 Claims, 14 Drawing Sheets

SPARK PLUG HAVING A REDUCED LEAD GLAZE LAYER ON THE INSULATOR THEREOF

BACKGROUND OF THE INVENTION

1. Field of the Invention

This invention relates to a spark plug and production thereof.

2. Description of the Related Art

A spark plug used for ignition of an internal engine of automobiles, etc. generally comprises a metal shell to which a ground electrode is fixed, an insulator made of alumina ceramics, etc. which is disposed inside the metal shell, and a center electrode which is disposed inside the insulator. The insulator projects from the rear opening of the metal shell in the axial direction. A spark plug terminal (hereinafter "terminal") is inserted into the projecting part of the insulator and connected to the center electrode via a conductive glass seal layer, which is formed by a glass sealing technique, a resistor, and the like. A high voltage is applied to the terminal to cause a spark over the gap between the ground electrode and the center electrode.

Under some combined conditions, for example, at an increased spark plug temperature and an increased environmental humidity, it may happen that high voltage application fails to cause a spark over the gap but, instead, a discharge called a flashover occurs between the terminal and the metal shell, going round the projecting insulator. Primarily for the purpose of avoiding flashovers, most of commonly used spark plugs have a glaze layer on the surface of the insulator. A glaze layer also serves to smoothen the insulator surface thereby preventing contamination and to enhance the chemical or mechanical strength of the insulator.

Lead glazes have been applied to alumina ceramics as an insulator. A lead glaze is silicate glass compounded with a relatively large amount of PbO to have a lowered softening point. In recent years, however, with a globally increasing concern about environmental conservation, glazes containing lead have been losing acceptance. In the automobile industry, for instance, where spark plugs find a huge demand, it has been a subject of study to phase out lead grazes in the future, taking into consideration the adverse influencs of waste spark plugs on the environment.

Borosilicate glass- or alkali borosilicate glass-based glazes have been studied as a substitute for the conventional lead glazes, but they have their own disadvantages, such as a high glass transition point or an insufficient insulation resistance. To address this problem, JP-A-11-43351 proposes a leadless glaze composition having an adjusted Zn component content, etc. to improve glass stability without increasing the viscosity (i.e., without reducing flowability) and JP-A-11-106234 discloses a leadless glaze composition which contains a combination of two or more alkali components to improve insulation resistance.

A glaze formed on an insulator of a spark plug is more apt to rise in temperature than on general insulating porcelain because, for one thing, the spark plug is used as fitted into an engine block of a vehicle. Further, in recent years the voltage applied to a spark plug has been increasing with advancing performance of engines. For these, a glaze for this use has been required to have insulation performance withstanding severer conditions of use.

In the light of these circumstances, the glaze composition disclosed in JP-A-11-106234 supra is not always satisfactory in high-temperature insulating performance, particularly the performance as evaluated as a glaze layer formed on an insulator in a spark plug (e.g., anti-flashover properties).

Both the compositions reported in JP-A-11-43351 and JP-A-11-106234, especially the former, have a relatively high Zn component content (10 to 30 mol %). According to the present inventors' researches, it has been revealed that too high a Zn component content tends to make it difficult to obtain a smooth glazed surface. This tendency is conspicuous when firing is carried out in an atmosphere containing much steam as in a gas-firing furnace.

SUMMARY OF THE INVENTION

An object of the present invention is to provide a spark plug having a glaze layer on the insulator thereof, wherein the glaze layer has a reduced Pb content, is capable of being fired at a relatively low temperature, exhibits excellent insulation properties, and can have a smooth surface.

The above object is accomplished by the present invention.

The present invention provides, in its first aspect, a spark plug comprising a center electrode, a metal shell, and an alumina ceramic insulator disposed between the center electrode and the metal shell, at least part of the surface of the insulator being coated with a glaze layer comprising oxides, wherein the glaze of the glaze layer comprises:

1 mol % or less, in terms of PbO, of a lead component, 25 to 60 mol %, in terms of $SiO_2$, of an Si component, 10 to 40 mol %, in terms of $B_2O_3$, of a B component, 0.5 to 9.5 mol %, in terms of ZnO, of a Zn component, 5 to 25 mol %, in terms of BaO, of a Ba component, the total content of the Si component, the B component, the Zn component, and the Ba component being 60 to 98 mol % in terms of the respective oxides, the total content of the Zn component and the Ba compound being 9 to 30 mol % in terms of the respective oxides, and 2 to 15 mol % of at least one alkali metal component selected from an Na component, a K component, and an Li component in terms of $Na_2O$, $K_2O$ or $Li_2O$.

From the environmental consideration it is a premise of the present invention that the Pb component content in the glaze be 1.0 mol % or less in term of PbO. This premise applies to not only the above-described first aspect but the second and the third aspects of the present invention hereinafter described. A glaze with its Pb component content reduced to this level will hereinafter be referred to as a leadless glaze. When a Pb component is present in a glaze in the form of an ion of lower valency (e.g., $Pb^{2+}$), it can be oxidized to an ion of higher valency (e.g., $Pb^{3+}$) by a corona discharge from the glaze layer surface, etc. If this happens, the insulating properties of the glaze layer are reduced, which can result in a flashover phenomenon. From this viewpoint, too, the limited Pb content is beneficial. A preferred Pb content is 0.1 mol % or less. It is the most preferred for the glaze to contain substantially no Pb, except a trace amount of lead unavoiodably incorporated together with raw materials.

The glaze used in the first aspect of the present invention has a specifically designed composition for securing insulating properties, optimizing the firing temperature, and improving the firing finish while reducing the Pb content. A Pb component in a conventional glaze has played an important role in softening point adjustment. That is, a Pb component serves to lower the softening point of a glaze moderately to secure flowability in application. In a leadless glaze, it is a B component ($B_2O_3$) and an alkali metal component that take part in softening point adjustment. The present inventors have proved that there is a specific range for a B component content that is suited to improve firing finish (specifically a range of from 10 to 40 mol % in terms of $B_2O_3$). Particularly when firing is carried out in an atmosphere containing relatively much steam as in a gas-firing furnace, it is very advantageous to limit the B component content within this range.

To limit the total content of the alkali metal component as well as the B component content is effective in facilitating formation of a glaze layer with a uniform thickness and few defects such as seeds or bubbles. For example, in preparing a glaze slurry of a mixed powder, the alkali metal component and the B component, if present in excessive amounts, dissolve in the dispersing medium such as water to increase the viscosity of the slurry. If the visocsty of the slurry extremely increases (e.g., exceeds 1000 mPa·s), it is difficult to form a coating layer having a uniform thickness, and the possibility of air bubbles entrapment increases. A proper selection of the alkali metal component content and the B component content within the respective specific ranges makes it possible to easily prepare a glaze slurry having a low viscosity and satisfactory flowability thereby to form a glaze layer of uniform thickness and with few defects.

A glaze composition with a reduced B component content would have an increased difference in linear expansion coefficient (i.e., linear expansion coefficient) from the alumina ceramic insulator and also would have a raised softening point to have reduced flowability on firing. This can be compensated for, in the first aspect of the invention, by adding a Zn component, a Ba component, and an alkali metal component. While a Zn component is effective in improving the linear expansion coefficient, the present inventors have found that addition of too much Zn tends to impair transparency to cause another appearance defect. Hence, the Zn component content is limited to a range of from 0.5 to 9.5 mol %, which is lower than in conventional glaze compositions, to avoid such a defect.

The grounds for limiting the range of the content of each component constituting the glaze layer in the first aspect of the invention are described below in detail. If the Si component content is less than 25 mol %, the glaze has too large a linear expansion coefficient and readily suffers from such defects as crazing, resulting in a failure to secure satisfactory glaze finish, the object of the first aspect. If, on the other hand, the Si component content exceeds 60 mol %, the glaze has too high a softening point, resulting in a defective appearance due to insufficient melting. A preferred Si component content is 35 to 55 mol %.

If the B component content is less than 10 mol %, the softening point of the glaze increases to make firing difficult. If it is more than 40 mol %, the glaze layer tends to suffer from crimping and, while dependent on the contents of other components, sometimes has such problems as devitrification, reduction in insulating properties, and missmatching of expansion coefficient with the substrate insulator. A preferred B component content is 20 to 30 mol %.

With a Zn component content of smaller than 0.5 mol %, the glaze has too large a linear expansion coefficient, tending to suffer from defects, such as cracking and peeling. Since a Zn component is also effective in reducing the softening point of the glaze, its shortage leads to an increased soften-ing point, which may result in insufficient glaze firing. Where the content of the Zn component is more than 9.5 mol %, devitrification can occur to make the glaze layer opaque, and the insulating properties of the glaze layer tend to be insufficient. A preferred Zn component content is 3 to 7 mol %.

A Ba component is contributory to improvement in insulating properties and also effective in improving durability (water resistance) and strength. When the Ba component content is less than 5 mol %, the glaze has reduced insulating properties, which may lead to insufficient anti-flashover properties. If the Ba component exceeds 25 mol %, the softening point tends to become too high to carry out firing, and the glaze has too large a linear expansion coefficient, tending to suffer from defects such as crazing. A preferred Ba component content is 5 to 15 mol %. A part of or the whole of the Ba component can be replaced with an Sr component. In this case, a further improvement on impact resistance of the glaze layer can sometimes result. Depending on raw materials used, a Ba component or an Sr component sometimes exists in the glaze in a form other than their oxide form. For example, in using $BaSO_4$ as a Ba source, a sulfur component may remain in the glaze. The sulfur component tends to be localized near the surface of the glaze layer to reduce the surface tension of the molten glaze, which is effective to increase the surface smoothness of the resulting glaze layer.

The total content of the Zn component and the Ba component should range from 9 to 30 mol %. If this total is smaller than 9 mol %, the glaze may have too high a softening point and be difficult to fire. Where the total content is more than 30 mol %, the glaze is liable to devitrification. A preferred total content of the Zn component and the Ba component is 10 to 20 mol %.

The alkali metal component serves to lower the softening point of a glaze. If the alkali metal component content is less than 2 mol %, the glaze will have an increased softening point, which tends to be too high to conduct firing. If it exceeds 15 mol %, the glaze tends to have reduced insulating properties, resulting in insufficient anti-flashover properties. A preferred alkali metal component content is 3 to 10 mol %.

It is preferred to use a combination of two kinds selected from an Na component, a K component, and an Li component as the alkali metal component, which is effective in suppressing reduction in insulating properties. This means that the alkali metal content is allowed to increase while minimizing reduction in insulating properties. As a result, the two objects—to secure anti-flashover properties and to lower the firing temperature—can be accomplished at a time. It is possible to add as a third component other alkali metal component(s) in such an amount that does not impair the above-described effect of combined alkali metal components in suppressing reduction of insulating properties. In order to minimize the reduction in insulating properties, the amount of each alkali metal component to be added is desirably 5 mol % or less.

In the first (and also the second) aspect of the present invention, the total content of the Si component, B component, Zn component and Ba component, which are main and essential components of the glaze, is 60 to 98 mol %. When this total exceeds 98 mol %, the glaze tends to have too high a softening point to fire. If the total is less than 60 mol %, it is difficult to adjust the softening point and the linear expansion coefficient while securing insulating properties. A preferred total content of the first and the second components is 70 to 95 mol %.

The present invention further provides, in its second aspect, a spark plug having the same structure as in the first aspect, except that the glaze layer comprises:

1 mol % or less, in terms of PbO, of a lead component,
25 to 60 mol %, in terms of $SiO_2$, of an Si component,
10 to 40 mol %, in terms of $B_2O_3$, of a B component,
1.5 to 20 mol %, in terms of ZnO, of a Zn component,
5 to 25 mol %, in terms of BaO, of a Ba component, the total content of the Si component, the B component, the zn component, and the Ba component being 60 to 98 mol % in terms of the respective oxides, the total content of the Zn component and the Ba component being 9 to 30 mol % in terms of the respective oxides, the content of the B component, taken as NB2O3 (mol %), the content of the Zn component, taken as NZnO (mol %), and the content of the Ba component, taken as NBaO (mol %), in terms of the respective oxides, satisfying the relationships: NB2O3>NZnO and NBaO>NZnO, and 2 to 15 mol % of at least one alkali metal component selected from an Na component, a K component, and an Li component in terms of $Na_2O$, $K_2O$ or $Li_2O$.

In the second aspect of the invention, the Zn component content is increased over that of the first aspect to a range of from 1.5 to 20 mol %, the B component content (NB2O3) is greater than the Zn component content (NZnO), and the Ba component content (NBaO) is greater than the Zn component content. As a result, the glaze composition achieves both accelerated vitrification and further improvement on insulating properties. That is, even though the Zn component content is higher than the upper limit specified in the first aspect (i.e., 9.5 mol %), it is possible to secure satisfactory insulating properties while suppressing appearance defects due to devitrification. In order to enhance the above effects, it is desirable that NB2O3>NBaO>NZnO.

The glaze can contain other alkaline earth metal components in addition to the Ba component. This also applies to the glaze layer of the first aspect. In particular, a Ca component and an Sr component is the most effective next to the Ba component or the Zn component in improving the insulating properties of the glaze layer. When the Zn component is used in a relatively large amount, particularly in an amount of 10 mol % or more, it is preferred from the standpoint of transparency and softening point that the glaze comprises an alkaline earth metal R component, wherein R is at least one of Ca, Sr, and Ba, at a content NRO (mol %) of more than 10 mol % in terms of the respective oxides RO and that the content RNO and the content of the zinc component in terms of ZnO, taken as NZnO (mol %), satisfy the relationship: NZnO/(NRO+NZnO)≦0.4. In order to enhance the effect on adjustment of the linear expansion coefficient and thereby to further improve the appearance of the glaze layer, it is still preferred that NZnO/(NRO+NZnO) be 0.1 or greater. The Sr component is also effective to improve the impact resistance of the glazed insulator. Here again, part of or the whole of the Ba component can be displaced with the Sr component.

The grounds for limiting the range of the content of each component constituting the glaze in the second aspect of the invention are the same as in the first aspect, except for the Zn component. The lower limit of the Zn component content is 1.5 mol %, slightly higher than that in the first aspect, so as to keep the linear expansion coefficient of the glaze on a proper level when the B component content or the Ba component content is larger than the Zn component content.

If the Zn component content exceeds 20 mol %, it is difficult to prevent devitrification even with an increase in B or Ba component being taken into consideration. A preferred Zn component content is 3 to 9.5 mol %.

The present invention further provides in its third aspect a spark plug comprising a center electrode, a metal shell, and an alumina ceramic insulator disposed between the center electrode and the metal shell, with at least part of the surface of the insulator being coated with a glaze layer comprising oxides, wherein the glaze layer comprises:

1 mol % or less, in terms of PbO, of a lead component, 35 to 80 mol % of a first component consisting of, based on the total glaze composition, 5 to 60 mol %, in terms of $SiO_2$, of an Si component and 3 to 50 mol %, in terms of $B_2O_3$, of a B component, 5 to 60 mol % of a second component consisting of at least one of a Zn component and an alkaline earth metal R component (wherein R is at least one member selected from Ca, Sr, and Ba), the content of the Zn component and the R component being expressed in terms of ZnO and RO, respectively, the total content of the first component and the second component being 65 to 98 mol %, and 2 to 15 mol % of at least one alkali metal component selected from an Na component, a K component, and an Li component in terms of $Na_2O$, $K_2O$ or $Li_2O$;

the insulator has an outwardly projecting portion on its periphery at the middle in the axial direction, the portion of the insulator which is in the rear of the projecting portion, the tip of the center electrode being taken as the front, (hereinafter referred to as the rear portion of the insulator) has a cylindrical shape around its base adjoining the projecting portion, and the glaze layer is formed to cover the cylindrical shape with a thickness of 7 to 50 µm.

In a vehicle engine, etc., a spark plug is connected to an electric part of the engine usually by means of a rubber cap. In order to secure anti-flashover properties, tightness between the insulator and the rubber cap is of importance. The present inventors have found it important to control the thickness of the glaze layer for obtaining a smooth glaze surface when a borosilicate or alkaline borosilicate glass type leadless glaze is used. They have ascertained that anti-flashover properties cannot be secured sufficiently without proper control on the glaze thickness around the base of the rear portion of the insulator because intimate contact with the rubber cap is especially required around this part. Hence, in the third aspect of the present invention, the thickness of the glaze layer covering the base of the rear portion of the insulator is limited within the above-specified range in addition to the limitation on the leadless glaze composition. According to the third aspect, an intimate fit of a rubber cap on the glaze surface can be achieved without impairing the insulating properties of the glaze layer, and excellent anti-flashover properties are ensured thereby.

If the thickness of the glaze layer on that part is smaller than 7 µm, the leadless glaze as specified above encounters difficulty in forming a smooth glaze surface. As a result, the contact with a rubber cap will be defective, resulting in insufficient anti-flashover properties. With the thickness of the glaze layer exceeding 50 µm, it would be difficult for the leadless glaze having the specified composition to secure insulating properties, which leads to insufficient anti-flashover properties. A preferred glaze layer thickness is 10 to 30 µm.

The grounds for limiting the range of the content of each component constituting the glaze used in the third aspect of the present invention are as follows. If the Si component content in the glaze is less than 5 mol %, the glaze hardly vitrifies, resulting in a failure to form a uniform glaze layer. If, on the other hand, it exceeds 60 mol %, the glaze has too small a linear expansion coefficient, tending to suffer from defects such as cracking and peeling.

The B component content is 3 to 50 mol % as $B_2O_3$. If the B component content is less than 3 mol %, the softening point of the glaze increases to make firing difficult or impossible. If it is more than 50 mol %, a slurry of the glaze has insufficient durability (or water resistance) and, in addition, the resulting glaze layer tends to have such problems as devitrification, reduction in insulating properties, and missmatching of linear expansion coefficient with the substrate insulator.

Where the total content of the second component, which comprises a Zn component and/or an alkaline earth metal R component, is smaller than 5 mol %, it tends to be impossible to accomplish firing at a predetermined temperature on account of the elevated softening point, and the glaze will have a large linear expansion coefficient, easily resulting in defects such as crazing. Where the total content of the second component is more than 60 mol %, it tends to be impossible to accomplish firing at a predetermined temperature due to the elevated softening point, and the glaze layer may have insufficient insulating properties, leading to insufficient anti-flashover properties. The limitations imposed on the total content of the first and the second components and on the alkali metal component are based on the same reasons as described with reference to the first and the second aspects of the present invention.

The third aspect of the invention can be combined in the practice with the first and second aspects, provided that the glaze composition to be used be selected from the ranges common to the first and second aspects. Such a combination will provide a further improved glaze finish and enhances the effects of the third aspect.

If desired, the glaze layer according to the first, second, and third aspects of the invention can contain, in addition to the above-described essential components, 0.5 to 30 mol %, in total, of at least one of an Al component, a Ca component, and an Sr component, the content of the Al component being 0.5 to 10 mol % in terms of $Al_2O_3$, the content of the Ca component being 0.5 to 10 mol % in terms of CaO, and the content of the Sr component being 0.5 to 30 mol % in terms of SrO. An Al component is effective in suppressing devitrification of the glaze. A Ca component and an Sr component are contributory to improvement of insulating properties of the glaze layer. Amounts of the Al, Ca and Sr components lower than the respective lower limits produce scarce effects. When added in amounts greater than the respective upper limits, these components tend to increase the softening point of the glaze excessively, making firing difficult or impossible.

The present invention further provides in its fourth aspect a spark plug comprising a center electrode, a metal shell, and an alumina ceramic insulator disposed between said center electrode and said metal shell, with at least part of the surface of said insulator being coated with a glaze layer comprising oxides, wherein the glaze layer comprises:

1 mol % or less, in terms of PbO, of a lead component,
25 to 60 mol %, in terms of $SiO_2$, of an Si component,
10 to 40 mol %, in terms of $B_2O_3$, of a B component,
0.5 to 9.5 mol %, in terms of ZnO, of a Zn component,
0.1 mol % or more, in terms of BaO, of a Ba component,
0.1 mol % or more, in terms of SrO, of an Sr component,
the total content of the Ba component and the Sr component being 5 to 25 mol % in terms of the respective oxides,
the total content of the Si component, the B component, the Zn component, the Ba component, and the Sr component being 60 to 98 mol % in terms of the respective oxides,
the content of the Ba component as BaO, taken as NBaO (mol %), and the content of the Sr component as SrO, taken as NSrO (mol %), satisfying the relationship: $4NBaO \leq NSrO$, and
2 to 15 mol % of at least one alkali metal component selected from an Na component, a K component, and an Li component in terms of $Na_2O$, $K_2O$ or $Li_2O$.

The glaze composition used in the fourth aspect and that of the first aspect have many of the essential components and their content ranges in common. The grounds for limiting the contents of the components described as to the first aspect substantially apply here. So the fourth aspect will be described only with reference to differences from the first aspect. The fourth aspect is characterized by positive addition of an Sr component. As previously noted, an Sr component is effective in improving mechanical strength, particularly impact strength, of a glazed insulator.

The present inventors have revealed that a reduction in Pb component in a glaze is apt to be accompanied with a relative reduction in mechanical strength, particularly impact resistance, of the glaze layer. As a result of further investigation, it has now been found that the impact resistance of a glaze layer can be improved markedly by increasing the content of an Sr component over a range that is decided in balance with other components. That is, the content of the Ba component as BaO, taken as NBaO (mol %), and the content of the Sr component as SrO, taken as NSrO (mol %), satisfy the relationship: $4NBaO \leq NSrO$. Barium and strontium belonging to the same group, a Ba component and an Sr component are similar in chemical characteristics. With respect to physical properties, particularly influences on the linear expansion coefficient of a glaze layer, however, an Sr component is less apt to increase the linear expansion coefficient. Therefore, an excessive increase of linear expansion coefficient of a glaze layer can be minimized by increasing the Sr component content relative to the Ba component content within such a range as satisfies the above-specified relationship. As a result, the difference in linear expansion coefficient between the glaze layer and the alumina ceramic insulator can be made smaller. It is considered that a tensile stress occurring in the glaze layer on glaze firing, which arises from a difference in linear expansion coefficient between the glaze layer and the substrate insulator, hardly remains in the glaze layer, resulting in marked improvement in impact strength.

The present invention further provides in its fifth aspect a spark plug comprising a center electrode, a metal shell, and an alumina ceramic insulator disposed between the center electrode and the metal shell, with at least part of the surface of the insulator being coated with a glaze layer comprising oxides, wherein the glaze layer comprises:

1 mol % or less, in terms of PbO, of a Pb component,
25 to 60 mol %, in terms of $SiO_2$, of an Si component,
10 to 40 mol %, in terms of $B_2O_3$, of a B component,
0.5 to 9.5 mol %, in terms of ZnO, of a Zn component,
0.1 mol % or more, in terms of BaO, of a Ba component,
0.1 mol % or more, in terms of SrO, of an Sr component,
the total content of the Ba component and the Sr component being 5 to 25 mol % in terms of the respective oxides, the total content of the Si component, the B component, the Zn component, the Ba component, and the Sr component being 60 to 98 mol % in terms of the respective oxides, the content of the Zn component as ZnO, taken as NZnO (mol %), the content of the Ba component as BaO, taken as NBaO (mol %), and the content of the Sr component as SrO, taken as NSrO (mol %), totalizing 10 to 30 mol % and satisfying the relationship: NZnO/(NBaO+NSrO)≦0.7, and 2 to 15 mol % of at least one alkali metal component selected from an Na component, a K component, and an Li component in terms of $Na_2O$, $K_2O$ or $Li_2O$.

Similarly to the fourth aspect, the fifth aspect of the invention aims at improvement of mechanical strength of a glazed insulator by positive addition of an Sr component. The total of NZnO, NBaO, and NSrO should be within the range of 10 to 30 mol %. If it is smaller than 10 mol %, the glaze tends to have an excessively elevated softening point, meeting difficulty in firing. If, on the other hand, that total is more than 30 mol %, the glaze layer tends to devitrify. A preferred total content (NZnO+NBaO+NSrO) is 15 to 25 mol %.

In addition, by limiting the value NZnO/(NBaO+NSrO) to 0.7 or smaller, an excessive increase of the linear expansion coefficient of the glaze layer can be suppressed to enhance the effect that the tensile stress due to the difference in linear expansion coefficient from the insulator hardly remains after firing. The impact resistance is further improved as a result.

The fourth and fifth aspects of the invention can be combined. The glaze of the fourth and fifth aspects can further comprise at least one of 0.5 to 10 mol %, in terms of $Al_2O_3$, of an Al component, 0.5 to 10 mol %, in terms of CaO, of a Ca component, and 0.5 to 10 mol %, in terms of MgO, of an Mg component, the total content of the Al component, the Ca component, and the Mg component being within a range of from 0.5 to 30 mol %. An Al component is effective in not only suppressing devitrification but further improving the impact resistance of the glaze layer. A Ca component and an Mg component are contributory to improvement of insulating properties of the glaze layer. Amounts of the Al, Ca and Mg components lower than the respective lower limits produce scarce effects. When added in amounts greater than the respective upper limits, these components tend to increase the softening point of the glaze excessively, making firing difficult or impossible.

In the light of factors causing fracture of the insulator of a spark plug, the present invention further provides in its sixth aspect a spark plug comprising a center electrode, a metal shell, and an alumina ceramic insulator disposed between the center electrode and the metal shell, with at least part of the surface of the insulator being coated with a glaze layer comprising oxides, wherein the glaze layer has a composition comprising:

1 mol % or less, in terms of PbO, of a lead component, 35 to 80 mol % of a first component consisting of, based on the total glaze composition, 5 to 60 mol %, in terms of $SiO_2$, of an Si component and 3 to 50 mol %, in terms of $B_2O_3$, of a B component, 5 to 60 mol % of a second component consisting of at least one of a Zn component and an alkaline earth metal R component (wherein R is at least one member selected from Ca, Sr, and Ba), the content of the Zn component and the R component being expressed in terms of ZnO and RO, respectively, the total content of the first component and the second component being 65 to 98 mol %, and 2 to 15 mol % of at least one alkali metal component selected from an Na component, a K component, and an Li component in terms of $Na_2O$, $K_2O$ or $Li_2O$;

the composition being adjusted so that the impact resistance of the insulator coated with the glaze layer may be such that the insulator has an impact-resistance angle of 35° or greater as obtained by a pendulum impact test in which, (1) the spark plug is vertically fixed to a mount by means of the metal shell with the sparking tip thereof, taken as the front, inside the mount and the rear portion of the insulator projecting upright from the rear end of the metal shell, (2) a pendulum having a 330 mm long arm and a steel striker weighing 1.13 kg at the tip thereof is set so as to be allowed to swing on its support (shoulder) that is positioned above the rear end of the projecting insulator in the axial direction of the insulator at such a height that the striker strikes 1 mm vertically below the rear end of the insulator, (3) the pendulum is allowed to swing through a prescribed angle θ from the vertical repeatedly while increasing the angle θ stepwise by 2° until the insulator is broken, and (4) the critical angle θ at which the insulator is broken is taken as an impact-resistance angle.

In recent internal combustion engines showing a remarkable increase of power output, the spark plugs are exposed to considerable vibrations and shocks in operation, and their fracture is of great concern. When the spark plug is fitted to a cylinder head particularly by using a power tool such as an impact wrench, it might be fractured under excess clamping torque. Hence, the composition and thickness of the glaze layer are adjusted so that the glazed insulator may have the above-identified impact-resistance angle of 35° or greater, whereby the insulator can effectively be protected from vibrations or shocks and prevented from fracture.

The glaze used in the sixth aspect can have the composition specified in the fourth or fifth aspect. In other words, the sixth aspect can be practiced in combination with the fourth or fifth aspect of the invention. The structural feature of the third aspect of the invention can be introduced into the insulator according to the fourth to sixth aspects. That is, the insulator can have an outwardly projecting portion on its periphery at the middle in the axial direction, and the rear portion of the insulator (i.e., the portion in the rear of the projecting portion as previously defined) has a cylindrical periphery around its base adjoining the projecting portion. The glaze layer is formed to cover the cylindrical periphery around the base with a thickness of 7 to 50 μm. When this structure is adopted, not only are anti-flashover properties improved as stated above but the impact resistance of the glazed insulator is further improved. When the glaze layer on that part is thinner than 7 μm, the anti-flashover properties tend to be insufficient, and such a thin glaze layer may fail to secure its own strength or to produce sufficient effects in hiding the surface defects of the insulator, resulting in insufficient impact resistance. If the thickness exceeds 50 μm, it would be difficult to secure insulating properties with the leadless glaze as specified, resulting in insufficient anti-flashover properties. Moreover, the residual stress after firing, which depends on the linear expansion coefficient and thickness of the glaze layer, tends to be too high, which can result in insufficient impact resistance. A still preferred glaze layer thickness is 10 to 30 μm.

Supplementary particulars which are common among the first through sixth aspects of the present invention will be described.

One or more of an Mo component, an Fe component, a W component, an Ni component, a Co component, and an Mn component can be added as auxiliary components to the glaze composition of the invention in a total amount of from 0.5 to 5 mol % in terms of the respective oxides, $MoO_3$, $Fe_2O_3$, $ZrO_2$, $WO_3$, $Ni_3O_4$, $Co_3O_4$, and $MnO_2$ to provide, with more ease, a glaze composition which exhibits markedly improved flowability on firing and therefore can be fired at a relatively low temperature to form a glaze layer having excellent insulating properties and a smooth surface.

Where the total content, in terms of the respective oxides, of at least one component of Mo, W, Ni, Co, Fe or Mn (hereinafter referred to as a flowability-improving transition metal component) is less than 0.5 mol %, the effect on flowability improvement for obtaining a smooth glaze layer is insubstantial. Where it exceeds 5 mol %, the softening point of the glaze tends to rise to make firing difficult or impossible.

When the content of the flowability-improving transition metal component is too high, there arises a problem that the glaze layer tends to suffer from unintended coloration. Pieces of information such as letters showing the name of a manufacturer, a figure, a lot number, etc. are often printed on the insulator in a colored glaze for labeling. If the background glaze layer assumes a noticeable color, the print would be invisible. Still another practical problem that can arise is that the color change of a glaze layer ascribed to an alteration to the composition may be taken by purchasers as a groundless alteration from "the" accustomed color and may lose their full acceptance.

Of these flowability-improving transition metals, Mo and Fe are the most effective, and W is the next in improving flowability of a molten glaze. It is acceptable that the flowability-improving transition metal component consists solely of Mo, Fe or W. For enhancing the flowability improving effect, it is preferred for the flowability-improving transition metal component to comprise at least 50 mol % of an Mo component. While the Fe source of the glaze raw material may be in the form of either an Fe(II) ion (as in, e.g., FeO) or an Fe(III) ion (as in, e.g., $Fe_2O_3$), the Fe component content in the resulting glaze layer is represented in terms of $Fe_2O_3$ irrespective of the valency of Fe ions.

The glaze composition can further contain one or more of a Zr component, a Ti component, an Hf component, an Mg component, a Bi component, an Sn component, an Sb component, and a P component as auxiliary components in a total amount of 0.5 to 5 mol % in terms of the respective oxides, $ZrO_2$, $TiO_2$, $HfO_2$, MgO, $Bi_2O_3$, $SnO_2$, $Sb_2O_5$, and $P_2O_5$. These auxiliary components can be added as external additives according to necessity, or they are unavoidably incorporated as impurities (or contaminants) originated in raw materials (or a clay mineral hereinafter described, which is added in the preparation of a glaze slurry) or refractories used in a melting step.

These auxiliary components are appropriately added according to the purpose, for example, of controlling the softening point ($Bi_2O_3$, $ZrO_2$, $TiO_2$ or $HfO_2$ can serve for this), of improving insulating properties ($ZrO_2$ or MgO can serve for this), and adjusting the color tone. Addition of a Ti component, a Zr component or an Hf component brings about improvement on durability of the glaze. A Zr component or an Hf component is more effective in improving durability than a Ti component. For a glaze to have "satisfactory durability" means that a slurry of a glaze powder in a medium, such as water, does not increase its viscosity due to dissolution of a component in water when left to stand for a long time. With a glaze slurry having satisfactory durability, it would be easy to coat the insulator to a proper thickness with reduced thickness variation. It follows that the glaze layer formed on firing could have a proper thickness as intended with reduced thickness variation. An Sb component or a Bi component is effective in improving the flowability on firing to suppress seed or bubble formation in the resulting glaze layer and also to entrap foreign matter adhered to the surface into the flow thereby preventing it from becoming abnormal projections.

The present invention further provides in its seventh aspect a spark plug comprising a center electrode, a metal shell, and an alumina ceramic insulator disposed between the center electrode and the metal shell, at least part of the surface of the insulator being coated with a glaze layer comprising oxides, wherein the glaze layer comprises:

1 mol % or less, in terms of PbO, of a lead component, 35 to 80 mol % of a first component consisting of, based on the total glaze, 5 to 60 mol %, in terms of $SiO_2$, of a silicon component and 3 to 50 mol %, in terms of $B_2O_3$, of a boron component, 5 to 60 mol % of a second component consisting of at least one of a zinc component and an alkaline earth metal R component (wherein R is at least one member selected from Ca, Sr, and Ba), the content of the zinc component and the R component being expressed in terms of ZnO and RO, respectively, the total content of the first component and the second component being 60 to 98 mol %, 2 to 15 mol % of at least one alkali metal component selected from a sodium component, a potassium component, and a lithium component in terms of $Na_2O$, $K_2O$ or $Li_2O$, and 0.5 to 5 mol % of at least one transition metal component selected from a molybdenum component, a tungsten component, a nickel component, a cobalt component, an iron component, and a manganese component, the content of the at least one transition metal component being expressed in terms of $MoO_3$, $WO_3$, $Ni_3O_4$, $Co_3O_4$, $Fe_2O_3$ and $MnO_2$.

From the environmental consideration it is a premise of the present invention that the Pb component content in the glaze be 1.0 mol % or less in term of PbO. A glaze with its Pb component content reduced to this level will hereinafter be referred to as a leadless glaze. When a Pb component is present in a glaze in the form of an ion of lower valency (e.g., $Pb^{2+}$), it can be oxidized to an ion of higher valency (e.g., $Pb^{3+}$) by a corona discharge from the glaze layer surface, etc.

If this happens, the insulating properties of the glaze layer are reduced, which can result in a flashover phenomenon. From this viewpoint, too, the limited Pb content is beneficial. A preferred Pb content is 0.1 mol % or less. It is the most preferred for the glaze to contain substantially no Pb, except a trace amount of lead unavoidably incorporated together with raw materials.

The glaze used in the seventh aspect of the present invention has a specifically designed composition for securing insulating properties, optimizing the firing temperature, and improving the firing finish while reducing the Pb content. A Pb component in a conventional glaze has played an important role in softening point adjustment. That is, a Pb component serves to lower the softening point of a glaze moderately to secure flowability in application. In a leadless glaze, it is a B component ($B_2O_3$) and an alkali metal component that take part in softening point adjustment. The present inventors have found that there is a specific range of a B component content relative to an Si component content that is suited to improve firing finish. Within this specific B content range, they have also found that addition of at least one of Mo, W, Ni, Co, Fe, and Mn in a specific amount provides a glaze composition that exhibits markedly improved flowability and therefore can be fired at a relatively low temperature to form a glaze layer having excellent insulating properties and a smooth glazed surface. The present invention has been reached based on these findings.

The grounds for limiting the range of the content of each component constituting the glaze are as follows. Where the total content, in terms of oxides, of at least one component of Mo, W, Ni, Co, Fe or Mn (hereinafter referred to as an essential transition metal component) is less than 0.5 mol %, the effect on flowability improvement is insufficient for obtaining a smooth glaze layer. Where it exceeds 5 mol %, an excessively elevated softening point tends to make firing difficult or impossible.

When the content of the essential transition metal component is too high, there arises another problem that the glaze tends to suffer from unintended coloration. Pieces of information such as letters showing the name of a manufacturer, a figure, a lot number, etc. are often printed on the insulator in a colored glaze for labeling. If the background glaze layer assumes a noticeable color, the print would be invisible. Still another practical problem that can arise is that the color change of a glaze layer ascribed to an alteration to the composition may be taken by purchasers as a groundless alteration from "the" accustomed color and may lose their full acceptance.

The insulator used in the invention, which is a substrate to be glazed, is made up of white alumina ceramic. In order to prevent or minimize the above-described inconveniences due to coloration, it is desirable to control the glaze composition, for example, the content of the essential transition metal component so that the glaze layer formed on such a white insulator can have a chroma Cs of 0 to 6 and a value Vs (lightness) of 7.5 to 10. A hue with a chroma exceeding 6 is noticeably perceived by the naked eye, and a hue with a value smaller than 7.5 appears grayish or blacky. A glaze layer whose color is out of either one of the above chroma and value ranges cannot dispel the impression that it is obviously colored. It is desirable that the chroma Cs be 0 to 2, particularly 0 to 1, and that the value Vs be 8 to 10, particularly 9 to 10. In the present invention the value Vs and the chroma Cs are measured in accordance with the methods specified in JIS Z8722 "Methods of Colour Measurement/4. Spectrophotometric colorimetry/4.3 Method of Measuring Reflecting Objects". In a simpler manner, the value and chroma can also be obtained by visual color judgement using standard color chips prepared according to JIS Z8721.

Of the essential transition metals, Mo is the most effective, and W is the next in improving flowability of a molten glaze. It is acceptable that the essential transition metal component consists solely of Mo or W. For enhancing the flowability improving effect, it is preferred for the essential transition metal component to comprise at least 50 mol % of an Mo component.

If the Si component content in the glaze is less than 5 mol %, the glaze hardly vitrifies, resulting in a failure to form a uniform glaze layer. If, on the other hand, it exceeds 60 mol %, the glaze has too small a linear expansion coefficient, tending to suffer from defects such as cracking and peeling. A preferred Si component content is 15 to 60 mol %.

If the B component content is less than 3 mol %, the softening point of the glaze increases to make firing difficult or impossible. If it is more than 50 mol %, the glaze layer has insufficient durability (or water resistance) and, in addition, tends to have such problems as devitrification, reduction in insulating properties, and missmatching of linear expansion coefficient with the substrate insulator. A preferred B component content is 10 to 50 mol %. It is preferred that the ratio of the Si component content, taken as NSiO2 (mol %), to the B component content, taken as NB2O3 (mol %), i.e., NSiO2/NB2O3, be in the range of from 0.5 to 1.5. When this ratio is smaller than 0.5, inconveniences such as devitrification, reduction in insulating properties, and missmatching of linear expansion coefficient with the substrate, can result. With the ratio exceeding 1.5, the glaze has too small a linear expansion coefficient, tending to suffer from defects such as cracking and peeling.

In a preferred embodiment, the first component (i.e., the Si component plus the B component) comprises 15 to 29.5 mol % of the Si component as $SiO_2$ and 25 to 50 mol % of the B component as $B_2O_3$ based on the total glaze composition. In this embodiment, the glaze has a moderately lowered softening point to provide sufficiently flowable molten glass, which will make a glazed surface with good finish even in short-time firing. Glaze defects, such as crawling, crimping, parting, and pinholes, are also suppressed effectively.

Where the total content of the second component, which comprises a Zn component and/or an alkaline earth metal R component, is smaller than 5 mol %, it tends to be impossible to accomplish firing at a predetermined temperature on account of the elevated softening point, and the resulting glaze layer tends to have reduced anti-flashover properties due to insufficient insulating properties. Where the total content of the second component is more than 60 mol %, it tends to be impossible to accomplish firing at a predetermined temperature due to the elevated softening point, and the glaze will have too large a linear expansion coefficient, which may lead to such defects as crazing.

The total content of the first and the second components is from 60 to 98 mol %. If that total content exceeds 98 mol %, the glaze tends to have too high a softening point to fire. If the total content is smaller than 60 mol %, it is difficult to adjust the softening point and the linear expansion coefficient while securing insulating properties. A preferred total content of the first and the second components is 70 to 95 mol %.

Of the components making up the second component, a Zn component and a Ba component are particularly contributory to improvement in insulating properties and also effective in improving durability and strength. It is preferred to use the Zn component and the Ba component in amounts of 0.5 to 25 mol % as ZnO and 5 to 25 mol % as BaO. With a Zn component content of smaller than 0.5 mol %, the glaze may have too small a linear expansion coefficient, tending to suffer from defects, such as cracking and peeling. Since a Zn component is also effective on improvement of insulating properties, its shortage can result in insufficient insulation. Where the content of the Zn component is more than 25 mol %, devitrification can occur to make the glaze layer opaque. When the Ba component content is less than 5 mol %, the glaze has reduced insulating properties, tending to have insufficient anti-flashover properties. If the Ba component exceeds 25 mol %, the softening point tends to become too high to carry out firing.

The alkali metal component serves to lower the softening point of a glaze. If the alkali metal component content is less than 2 mol %, the glaze will have an increased softening point, which tends to be too high to conduct firing. If it exceeds 15 mol %, the glaze tends to have reduced insulating properties, resulting in insufficient anti-flashover properties. A preferred alkali metal component content is 3 to 10 mol %. The ratio of the alkali metal component, taken as NQ2O (mol %), to the B component content (NB2O3; mol %) (NQ2O/NB2O3) is preferably 0.1 to 0.25. When the ratio is smaller than 0.1, the softening point of the glaze may tend to be too high for firing. If the ratio exceeds 0.25, the glaze tends to have reduced insulating properties, which may lead to insufficient anti-flashover properties.

It is preferred to use a combination of at least two kinds selected from an Na component, a K component, and an Li component as the alkali metal component, which is effective in suppressing reduction in insulating properties. This means that the alkali metal content is allowed to increase while minimizing reduction in insulating properties. As a result, the two objects—to secure anti-flashover properties and to lower the firing temperature—can be accomplished at a time. It is possible to add as a third component other alkali metal component(s) in such an amount that does not impair the above-described effect of combined alkali metal components in suppressing electrical conductivity. In order to minimize the reduction in insulating properties, the amount of each alkali metal component to be added is desirably 5 mol % or less.

If desired, the glaze of the seventh aspect of the present invention can contain the following components in addition to the above-described essential components.

The glaze can contain one or more of 0.5 to 10 mol %, in terms of $Al_2O_3$, of an Al component, 0.5 to 10 mol %, in terms of CaO, of a Ca component, and 0.5 to 30 mol %, in terms of SrO, of one an Sr component in a total content (Al+Ca+Sr) of 0.5 to 30 mol %. An Al component is effective in suppressing devitrification of the glaze. A Ca component and an Sr component are contributory to improvement of insulating properties of the glaze. Amounts of the Al, Ca and Sr components lower than the respective lower limits produce scarce effects. When added in amounts greater than the respective upper limits, these components tend to increase the softening point of the glaze excessively, making firing difficult or impossible.

The glaze can further contain one or more of an Fe component, a Zr component, a Ti component, an Mg component, a Bi component, an Sn component, an Sb component, and a P component as auxiliary components in a total amount up to 5 mol % in terms of the respective oxides, $Fe_2O_3$, $ZrO_2$, $TiO_2$, MgO, $Bi_2O_3$, $SnO_2$, $Sb_2O_5$, and $P_2O_5$. These auxiliary components can be added as external additives according to necessity or unavoidably incorporated as impurities (or contaminants) originated in raw materials (or a clay mineral hereinafter described, which is added in the preparation of a glaze slurry) or refractories used in a melting step. While the Fe source of the glaze raw material may be in the form of either an Fe(II) ion (as in, e.g., FeO) or an Fe(III) ion (as in, e.g., $Fe_2O_3$), the Fe component content in the resulting glaze layer is represented in terms of $Fe_2O_3$ irrespective of the valency of Fe ions. These auxiliary components are appropriately added according to the purpose, for example, of controlling the softening point ($Bi_2O_3$, $ZrO_2$ or $TiO_2$ can serve for this), of improving insulating properties ($ZrO_2$ or MgO can serve for this), and adjusting the color tone. Addition of a Ti component or a Zr component brings about improvement on durability or chemical resistance of the glaze layer and suppresses the alkali metal component from dissolving out of the glaze thereby making contribution to improvement of dielectric strength. In particular, a Zr component is more effective in improving the chemical resistance than a Ti component. For a glaze composition or a formed glaze layer to have "satisfactory durability" means not only that a component hardly dissolves into water from a formed glaze layer but that an aqueous slurry of a glaze frit does not increase its viscosity due to elution of a component in water when left to stand for a long time. An Sb component is effective to suppress seed or bubble formation in a glaze layer.

While each of the aforementioned components in the glaze layer of the first to seventh aspects of the present invention exists in an oxide form, it is often impossible to identify the state of existence because, for one thing, they form an amorphous glass phase. Such cases are also included under the scope of the present invention as long as the contents of the components in terms of the respective oxides fall within the respective ranges as specified.

The content of each component constituting a glaze layer formed on the insulator can be determined by known microanalyses, such as electronic probe microanalysis (EPMA) and X-ray photoelectron spectroscopy (XPS). In carrying out EPMA, for instance, characteristic X-rays can be measured by either wavelength dispersive analysis or energy dispersive analysis. The composition can also be identified by peeling the glaze layer off the insulator and subjecting the peel to chemical analysis or gas analysis.

The spark plug according to the first to seventh aspects of the present invention can be constructed of an insulator having a through-hole through the middle, a center electrode inserted in the through-hole, and a co-axial terminal which is an integral part of the center electrode or which is a separate part and connected to the center electrode via an electrically conductive binder layer. The insulation resistance of the spark plug is measured by applying voltage between the terminal and the metal shell through the insulator while maintaining the whole spark plug at about 500° C. In order to secure dielectric strength in high temperature and to prevent a flashover from happening, it is preferred for the spark plug to have an insulation resistance of 200 MΩ or more.

An example of a system for insulation resistance measurement is shown in FIG. 8, in which a constant DC voltage power source (e.g., powder voltage: 1000 V) is connected to a terminal 13 of a spark plug 100, and a metal shell 1 is grounded. Voltage is applied while the spark plug 100 is being heated to 500° C. in a heating oven. In measuring a current Im by use of a resistor for current measurement (resistance: Rm) at a voltage VS, an insulation resistance Rx is obtained as [(VS/Im)–Rm]. In FIG. 8 the current Im is obtained from an output of a differential amplifier which amplifies the voltage difference between the terminals of the resistor.

The insulator is made of an alumina-based insulating material containing 85 to 98 mol %, in terms of $Al_2O_3$, of an Al component. It is preferred for the glaze to have an average linear expansion coefficient of $50 \times 10^{-7}$/° C. to $85 \times 10^{-7}$/° C. in a temperature range of from 20 to 350° C. Where the linear expansion coefficient is smaller than the lower limit, the glaze layer is liable to suffer from detects such as cracking and peeling. Where the linear expansion coefficient is greater than the upper limit, the glaze layer is apt to suffer from such defects as crazing. A still preferred linear expansion coefficient of the glaze ranges from $60 \times 10^{-7}$/° C. to $80 \times 10^{-7}$/° C.

The linear expansion coefficient of a glaze can be estimated from the value obtained with a known dilatometer on a specimen cut out of a glass block prepared by compounding and melting raw materials so as to give substantially the same composition as a glaze layer. The linear expansion coefficient of a glaze layer as formed on an insulator can be measured with, e.g., a laser interference meter or an atomic force microscope.

The spark plug of the first to seventh aspects of the present invention can be produced by, for example, a process comprising:

a step of preparing a glaze powder in which raw material powders are mixed in a predetermined ratio, the mixture is melted at 1000 to 1500° C. and quenched for vitrification, and grinding the glass into powder (a frit), a step of depositing the glaze powder on the surface of an insulator to form a glaze powder deposit, and a step of firing in which the insulator is fired to bake the glaze powder deposit onto the insulator surface to form a glaze layer.

The powdered raw material of each component includes not only an oxide or a complex oxide but other various inorganic materials capable of being converted to a corresponding oxide on heating and melting, such as a hydroxide, a carbonate, a chloride, a sulfate, a nitrate, and a phosphate. The quenching can be carried out by pouring the melt in water or atomizing the melt onto a chill roll to obtain flakes.

The glaze powder can be formulated into a slurry in water or a solvent. The slurry is applied to the insulator and dried to form a coating layer of the deposited glaze powder. The glaze slurry is conveniently applied onto the insulator by spraying from a spray nozzle to deposit a glaze powder to a uniform thickness with ease of thickness control.

The glaze slurry can contain an adequate amount of a clay mineral or an organic binder to improve the shape retention of the glaze powder deposited layer. Useful clay minerals include those comprising aluminosilicate hydrates, such as allophane, imogolite, hisingerite, smectite, kaolinite, halloysite, montmorillonite, vermiculite, and dolomite, which may be either natural or synthetic, and mixtures thereof. In relation to the oxide components of the glaze composition, clay minerals containing one or more of $Fe_2O_3$, $TiO_2$, CaO, MgO, $Na_2O$, and $K_2O$ in addition to $SiO_2$ and $Al_2O_3$ can be used.

The spark plug according to the first to seventh aspects of the present invention is constructed of an insulator having a through-hole piercing in the axial direction, a terminal fitted into one end of the through-hole, and a center electrode fitted into the other end. The terminal and the center electrode are electrically connected via an electrically conductive sintered body comprising glass and a conductive material (e.g., conductive glass seal or a resistor). The spark plug having such a structure can be made by a process including the following steps.

An assembly step: a step of assembling a structure comprising an insulator having a through-hole, a terminal fitted into one end of the through-hole, a center electrode fitted into the other end, and a green body formed between the terminal and the center electrode, the green body comprising a glass powder and a conductive material powder.

A firing step: a step of heating the structure having thereon a glaze powder deposited layer at a temperature of 800 to 950° C. to bake the glaze powder on the insulator to form a glaze layer and, at the same time, softening the glass powder in the green body.

A pressing step: a step of relatively bringing the center electrode and the terminal close within the through-hole of the heated structure thereby pressing the green body between the two members into an electrically conductive sintered body.

The conductive sintered body establishes an electrical connection between the terminal and the center electrode and seals the gap between the inner surface of the through-hole and the terminal and the center electrode. Therefore, the firing step also serves as a glass sealing step. The above-described process is efficient in that glass sealing and glaze firing are performed simultaneously. Further, since the above-described glaze composition allows the firing temperature to be reduced to 800 to 950° C., the center electrode and the terminal hardly suffer from oxidative damage so that the yield is improved.

The softening point of the glaze is preferably adjusted within a range of from 600 to 700° C. When the softening point is higher than 700° C., a firing temperature above 950° C. would be required to carry out both firing and glass sealing, which may accelerate oxidation of the center electrode and the terminal. When the softening point is lower than 600° C., the firing temperature should be set lower than 800° C., in which case the glass used in the conductive sintered body must have a low softening point in order to secure satisfactory glass seal. It follows that the glass in the conductive sintered body is liable to denaturation in long-term use of the spark plug in a relatively high temperature environment. Where, for example, the conductive sintered body comprises a resistor, such glass denaturation tends to result in deterioration of the performance, such as a life under load.

The term "softening point" of a glaze as used herein is a value measured by differential thermal analysis (DTA) on a glaze layer peeled off the insulator. It is obtained as a temperature of the peak appearing next to the first andothermic peak which is indicative of a sag point, i.e., the second endothermic peak temperature of a DTA curve. The softening point of a glaze can also be estimated from the value obtained with a glass sample which is prepared by compounding raw materials so as to give substantially the same composition as the glaze layer under analysis, melting the composition, and quenching. The composition to be used can be calculated on an oxide basis from the data obtained from the glaze layer to be analyzed.

BRIEF DESCRIPTION OF THE DRAWINGS

FIGS. 2A and 2B show the sparking part of the spark plug of FIG. 1, wherein FIG. 2A presents a half front view and a half cross-sectional view, and FIG. 2B presents an enlarged cross-section of the sparking part.

DETAILED DESCRIPTION OF THE INVENTION

Preferred embodiments in carrying out the present invention will be described with reference to the accompanying drawings.

Figure 1:
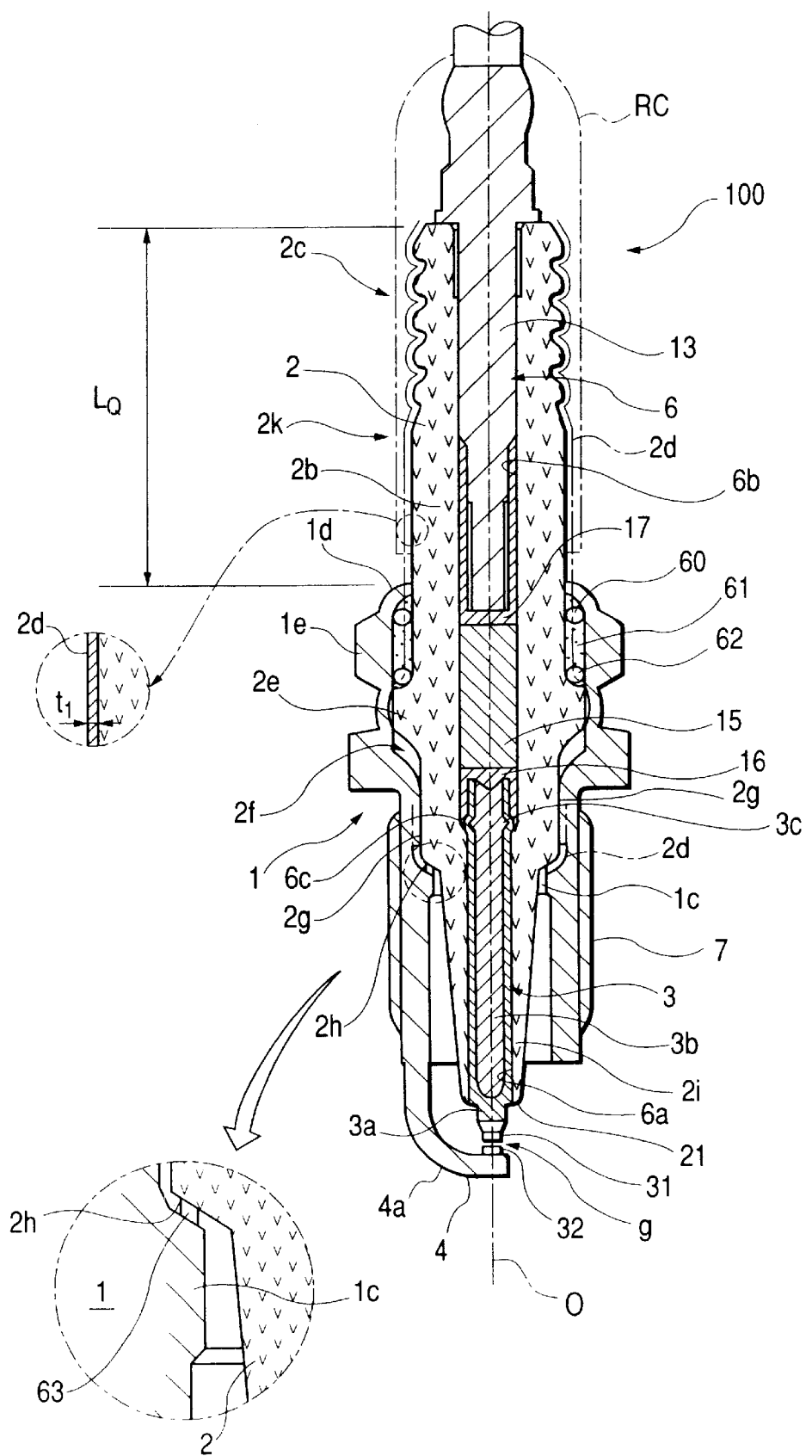
FIG. 1 is a vertical cross-section of a spark plug according to the present invention.
Figure 2A:
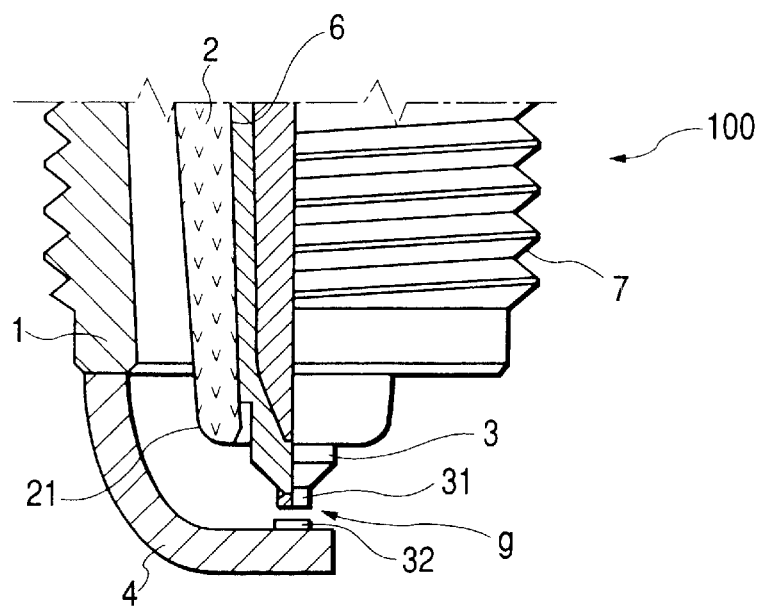
Figure 2B:
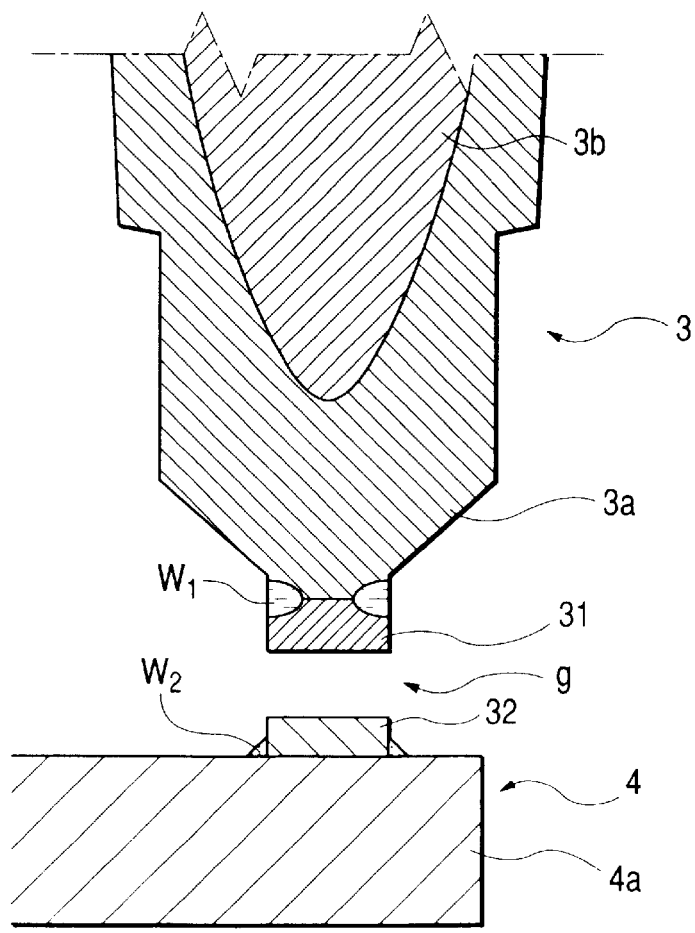

FIGS. 1 and 2A and 2B show an example of the spark plug according to the present invention. The spark plug 100 shown has a cylindrical metal shell 1, an insulator 2 fitted into the metal shell 1 with its tip 21 projecting from the front end of the metal shell 1, a center electrode 3 disposed inside the insulator 2 with its ignition part 31 formed at the tip being projecting over the tip 21 of the insulator 2, and a ground electrode 4 with its one end joined to the metal shell 1 by, for example welding and the other free end bent inward in such a manner that a side of the free end may face the tip (ignition part 31) of the center electrode 3. The ground electrode 4 has a counter ignition part 32 which faces the ignition part 31 to make a spark gap g between the facing ignition parts.

The metal shell 1 is a cylindrical housing made of metal, such as low carbon steel. It has a thread 7 therearound for screwing the spark plug 100 into an engine block (not shown). Symbol 1e is a hex nut portion over which a wrench or a like tool fits to fasten the metal shell 1.

The insulator has a through-hole 6 pierced in the middle in the axial direction. The metallic terminal 13 is inserted and fixed into one end of the through-hole 6, and the center electrode 3 is inserted and fixed into the other end. A resistor 15 is disposed in the through-hole 6 between the terminal 13 and the center electrode 3. The resistor 15 is connected at both ends thereof to the center electrode 3 and the terminal 13 via conductive glass seal layer 16 and 17, respectively. The resistor 15 and the conductive glass seal layers 16 and 17 constitute a conductive sintered body. The resistor 15 is formed by hot pressing a mixed powder of glass powder and a conductive material powder (and, if desired, ceramic powder other than glass) in a glass sealing step. The resistor 15 may be omitted. In this case, the conductive sintered body consists solely of the conductive glass seal layer.

The insulator 2 with the through-hole 6 in its axial direction is totally made of an insulating material, which is an alumina ceramic sintered body having an Al content of 85 to 98 mol %, preferably 90 to 98 mol %, in terms of $Al_2O_3$.

The insulating material can further contain 1.50 to 5.00 mol %, in terms of $SiO_2$, of an Si component, 1.20 to 4.00 mol %, in terms of CaO, of a Ca component, 0.05 to 0.17 mol %, in terms of MgO, of an Mg component, 0.15 to 0.50 mol %, in terms of BaO, of a Ba component, and 0.15 to 0.50 mol %, in terms of $B_2O_3$, of a B component.

As shown in FIG. 1, the insulator 2 has a flange-like outwardly projecting portion 2e on its periphery at the middle in the axial direction; a rear portion 2b (the portion in which the terminal 13 is inserted) whose outer diameter is smaller than the projecting portion 2e; a first front portion 2g in front of the projecting portion 2e, whose outer diameter is smaller than the projecting portion 2e; and a second front portion 2i in front of the first front portion 2g, whose outer diameter is smaller than the first front portion 2g. The rear end part of the rear portion 2b has its periphery corrugated to form corrugations 2c. The first front portion 2g is almost cylindrical, while the second front portion 2i is tapered toward the tip 21.

The center electrode 3 has a smaller diameter than that of the resistor 15. The through-hole 6 of the insulator 2 is divided into a first portion (front portion) 6a having a circular cross-section in which the center electrode 3 is fitted and a second portion 6b (rear portion) having a circular cross-section with a larger diameter than that of the first portion 6a. As shown in FIG. 1, the terminal 13 and the resistor 15 are disposed in the second portion 6b, with the center electrode 3 in the first portion 6a. The center electrode 3 has an outward projection 3c around its periphery near the rear end thereof, with which it is fixed to the insulator 2. The first portion 6a and the second portion 6b connect in the first front portion 2g of the insulator 2 (see FIG. 4A) to form a level difference on the inner wall of the hole 6, where the projection 3c of the center electrode 3 is caught. The level difference is beveled or rounded.

The first front portion 2g and the second front portion 2i of the insulator 2 connect at a connecting part 2h, where a level difference is formed on the outer surface of the insulator 2. The metal shell 1 has a projection 1c on its inner wall at the position meeting the connecting part 2h so that the connecting part 2h fits the projection 1c via a gasket ring 63 and is thus stopped. A gasket ring 62 is disposed between the inner wall of the metal shell 1 and the outer side of the insulator 2 at the rear of the flange-like projecting portion 2e, and a gasket ring 60 is provided in the rear of the gasket ring 62. The space between the two gaskets 60 and 62 is filled with a filler 61, such as talc. The insulator 2 is inserted into the metal shell 1 from the rear end of the metal shell 1, and the rear opening edge of the metal shell 1 is pressed inward to form a sealing lip 1d. The metal shell 1 and the insulator 2 are thus fixed to each other.

Figure 4A:
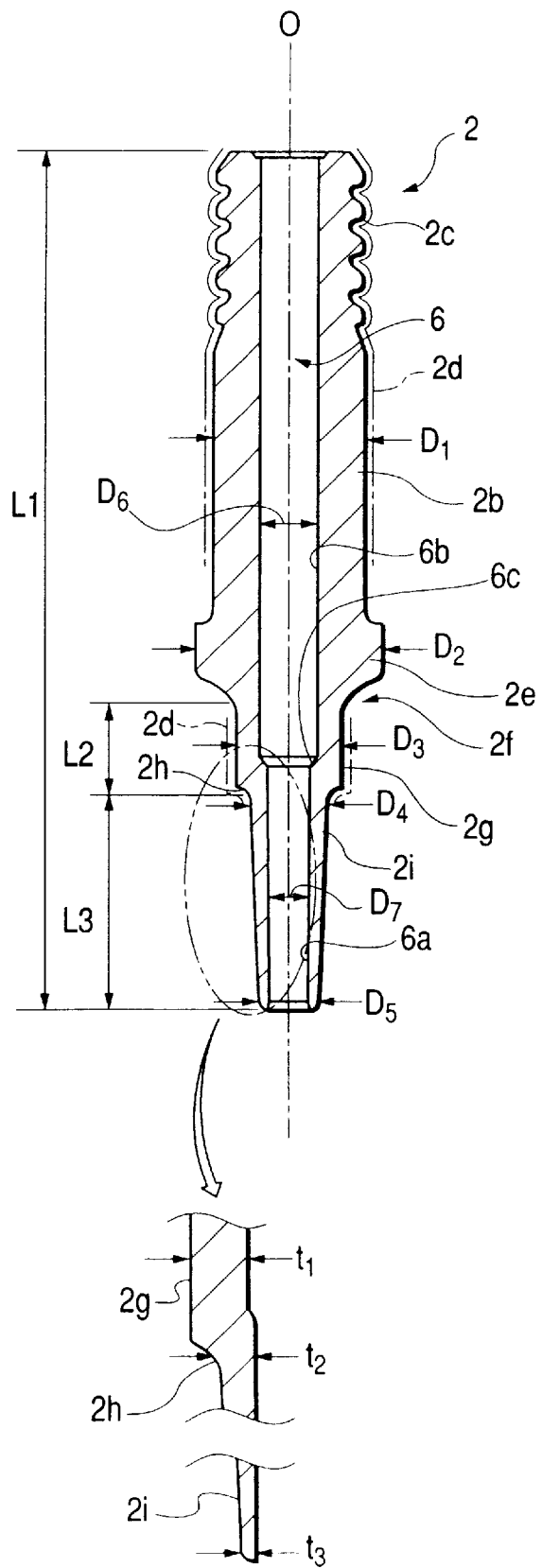
FIGS. 4A and 4B show examples of an insulator.
Figure 4B:
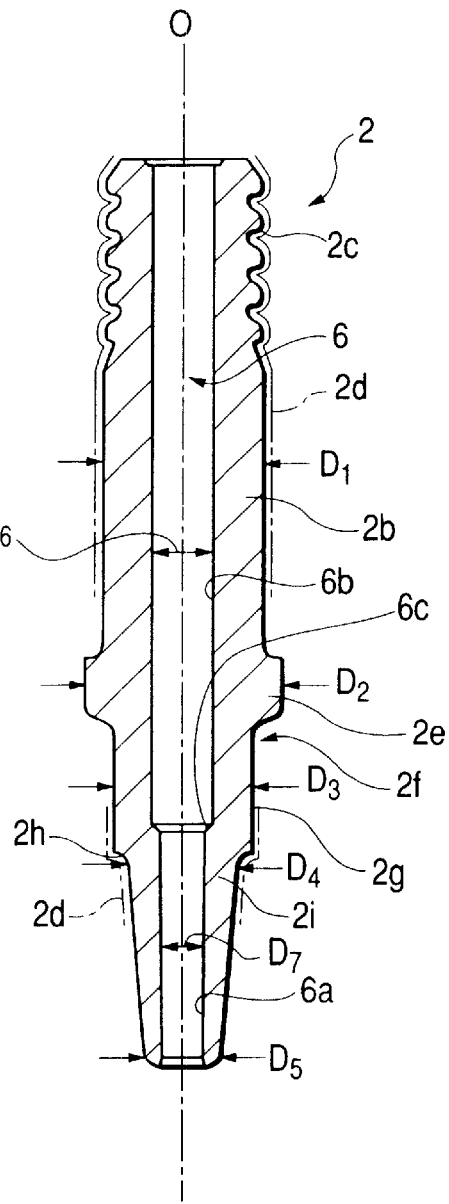

FIGS. 4A and 4B show practical examples of the insulator 2. The ranges of dimensions of these insulators are as follows.

Total length L1: 30 to 75 mm
Length L2 of first front portion 2g: 0 to 30 mm (exclusive of the connecting part 2f to the projecting portion 2e and inclusive of the connecting part 2h to the second front portion 2i)
Length L3 of the second front portion 2i: 2 to 27 mm
Outer diameter D1 of the rear portion 2b: 9 to 13 mm
Outer diameter D2 of the projecting portion 2e: 11 to 16 mm
Outer diameter D3 of first front portion 2g: 5 to 11 mm
Outer base diameter D4 of the second front portion 2i: 3 to 8 mm
Outer tip diameter D5 of the second front portion 2i (where the tip is rounded or beveled, the diameter D5 is measured at the base of the rounded or beveled part in a cross-section containing the center axial line O): 2.5 to 7 mm
Inner diameter D6 of the second portion 6b of the through-hole 6: 2 to 5 mm
Inner diameter D7 of the first portion 6a of the through-hole 6: 1 to 3.5 mm
Thickness t1 of the first front portion 2g: 0.5 to 4.5 mm
Thickness t2 of the second front portion 2i at the base (the thickness in the direction perpendicular to the center axial line O): 0.3 to 3.5 mm
Thickness t3 at the tip of the second front portion 2i (the thickness in the direction perpendicular to the center axial line O; where the tip is rounded or beveled, the thickness t3 is measured at the base of the rounded or beveled part in a cross-section containing the center axial line O): 0.2 to 3 mm
Average thickness tA ((t2+t3)/2) of the second front portion 2i: 0.25 to 3.25 mm The portion 2k of the insulator 2 which projects over the rear end of the metal shell 1 has a length LQ of 23 to 27 mm (e.g., about 25 mm). The length LP of the portion 2k as measured along its profile (the outer contour in a vertical cross-section containing the center axial line O, beginning from the rear end of the metal shell 1, passing across the surface of the corrugations 2c, and ending at the rear end of the insulator 2) is 26 to 32 mm (e.g., about 29 mm).

More specifically, the insulator 2 shown in FIG. 4A can have the following dimensions: L1=ca. 60 mm; L2=ca. 10 mm; L3=ca. 14 mm; D1=ca. 11 mm; D2=ca. 13 mm; D3=ca. 7.3 mm; D4=5.3 mm; D5=4.3 mm; D6=3.9 mm; D7=2.6 mm; t1=3.3 mm; t2=1.4 mm; t3=0.9 mm; and tA=1.15 mm.

The insulator 2 shown in FIG. 4B is designed to have slightly larger outer diameters in its first and second front portions 2g and 2i than the example shown in FIG. 4A. It can have the following dimensions: L1=ca. 60 mm; L2=ca. 10 mm; L3=ca. 14 mm; D1=ca. 11 mm; D2=ca. 13 mm; D3=ca. 9.2 mm; D4=6.9 mm; D5=5.1 mm; D6=3.9 mm; D7=2.7 mm; t1=3.3 mm; t2=2.1 mm; t3=1.2 mm; and tA=1.65 mm.

Figure 3:
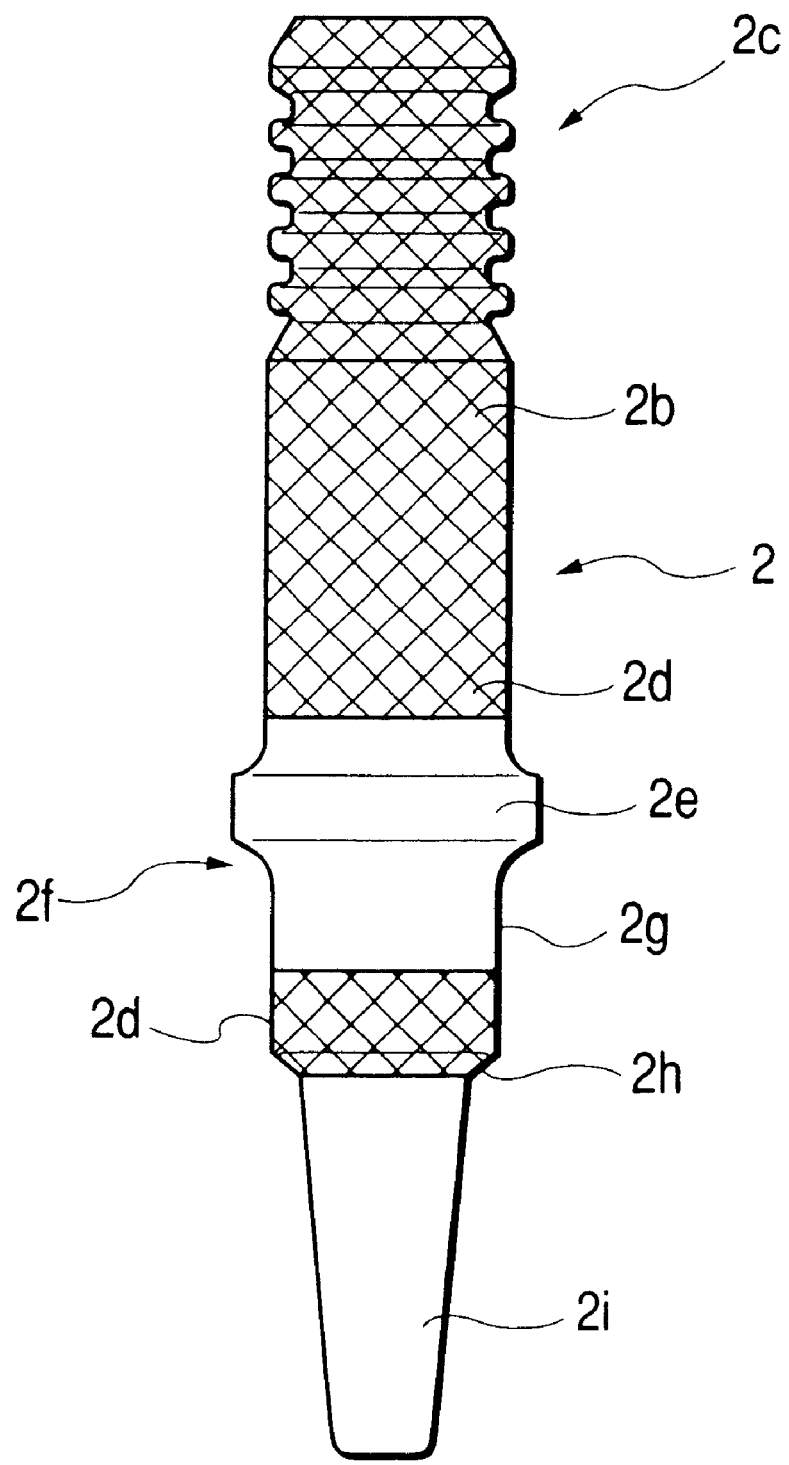
FIG. 3 is a front view of a partially glazed insulator.

As shown in FIG. 3, a glaze layer 2d is provided on the outer surface of the insulator 2, more specifically, on the peripheral surface of the rear portion 2b (inclusive of the corrugated part 2c) and on the pheripheral surface of a part of the first front portion 2g. The glaze layer 2d has a thickness of 10 to 150 µm, preferably 20 to 50 µm. As shown in FIG. 1, the glaze layer 2d on the rear portion 2b extends in the front direction farther from the rear end of the metal shell 1 to a prescribed length between the outer surface of the insulator 2 and the inner wall of the metal shell 1. The glaze layer 2d on the first front portion 2g covers the area in contact with the inner wall of the metal shell 1 from, for example, the middle (in the axial direction) of that portion up to the connecting part 2h where the gasket 63 is disposed.

Figure 13:
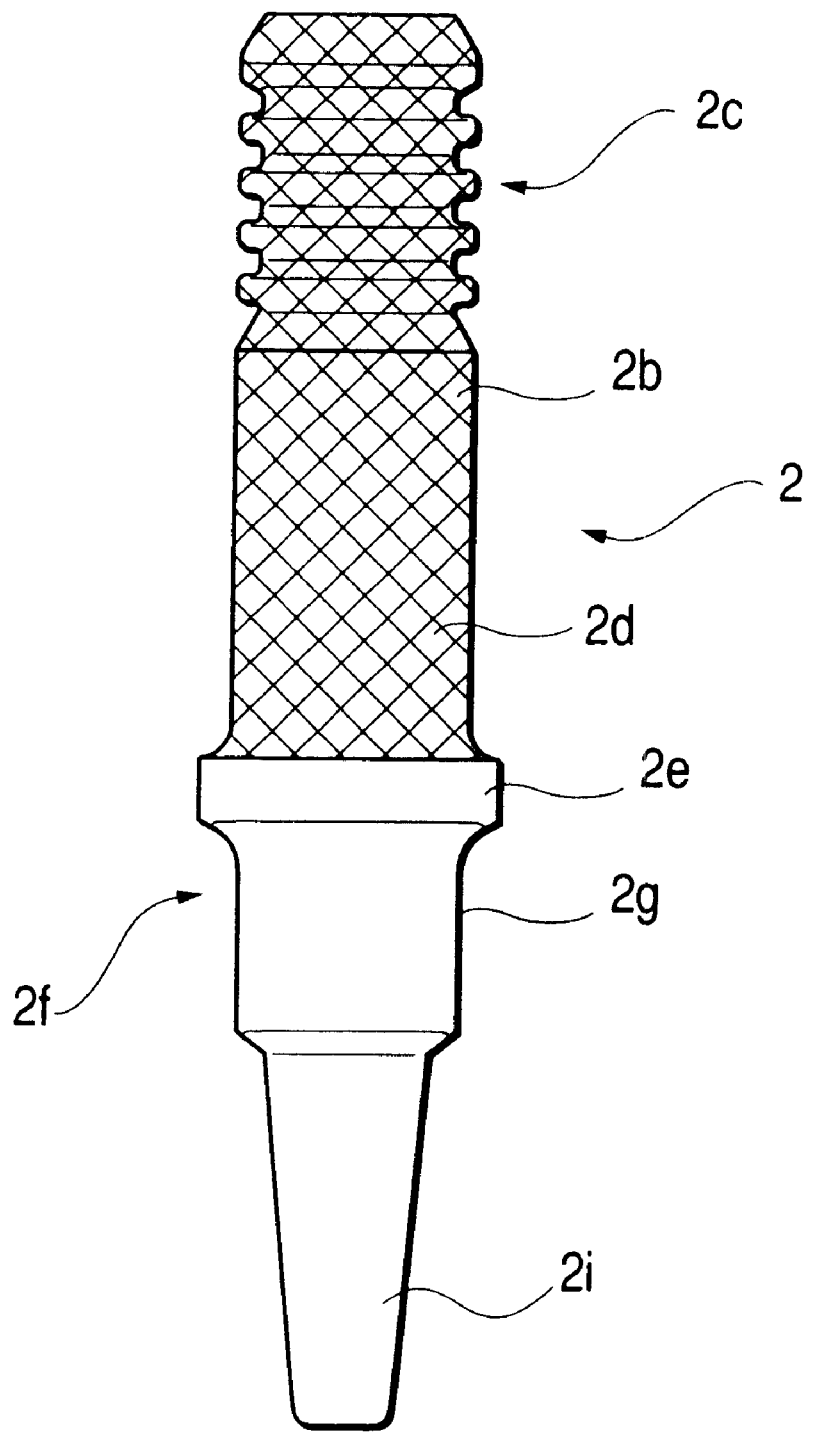
FIG. 13 is a front view of another partially glazed insulator.

The glazed insulator 2 shown in FIG. 3 has the glaze layer 2d on a part of the first front portion 2g and the connecting part 2h. In this embodiment, the gap between the inner wall of the projection 1c of the metal shell and the insulator 2 can be sealed tightly. Where sufficient tight seal is secured without the glaze layer 2d on this part, the glazing on this part could be omitted as shown in FIG. 13. In the embodiment shown in FIG. 13, the glaze layer 2d on the rear portion 2b extends to the rear end of the projecting portion 2e.

The glaze layer 2d has any one of the compositions according to the first to seventh aspects hereinabove described that are designed to accomplish the object of the invention and to produce the effects as aimed in the invention. The grounds for limitations imposed on the content of each constituent component are as described previously. The thickness T1 of the glaze layer formed on the base of the rear portion 2b (i.e., the cylindrical part between the corrugations 2c and the rear end of the metal shell 1) is 7 to 50 µm in average. The corrugations 2c may be omitted. In this case, the average thickness of the glaze layer 2d on the area from the rear end of the metal shell 1 up to a half of the length LQ of the insulator 2 is taken as T1.

As shown in FIG. 2B. the center electrode 3 is composed of a sheath 3a, a core 3b, and the previously described ignition part 31. The ground electrode 4 and the core 3b of the center electrode 3 are made of an Ni alloy, etc. The core 3b of the center electrode 3 is made of Cu, a Cu alloy, and the like for accelerating heat dissipation. The ignition part 31 and the counter ignition part 32 are made mainly of a noble metal alloy based on one or more of Ir, Pt, and Rh. As shown in FIG. 2B, the front end of the sheath 3a is tapered and has a flat tip, to which a disk made of the noble metal alloy is superposed, and the periphery of the joint is welded by laser welding, electron beam welding, resistance welding, and the like to form a weld $W_1$ thereby constructing the ignition part 31. In the same manner, the disk is superposed on the ground electrode 4 at the position facing the ignition part 31, and the periphery of the joint is welded to form a weld $W_2$ thereby constructing the ignition part 32. The disks used in the ignition parts are prepared by molding a molten metal comprising alloying components in a prescribed ratio or forming an alloy powder or a mixed powder of metals having a prescribed ratio and sintering the green body. At least one of the ignition parts 31 and 32 may be omitted.

The spark plug 100 can be produced as follows. In preparing the insulator 2, alumina powder is mixed with raw material powders of an Si component, a Ca component, an Mg component, a Ba component, and a B component in such a mixing ratio as to give the aforementioned composition after sintering, and the mixed powder is mixed with a prescribed amount of a binder (e.g., polyvinyl alcohol (PVA)) and water to prepare a slurry. The raw material powders include, for example, $SiO_2$ powder as an Si component, $CaCO_3$ powder as a Ca component, MgO powder as an Mg component, $BaCO_3$ powder as a Ba component, and $H_3PO_3$ component as a B component. $H_3BO_3$ may be added in the form of a solution.

Figure 9:
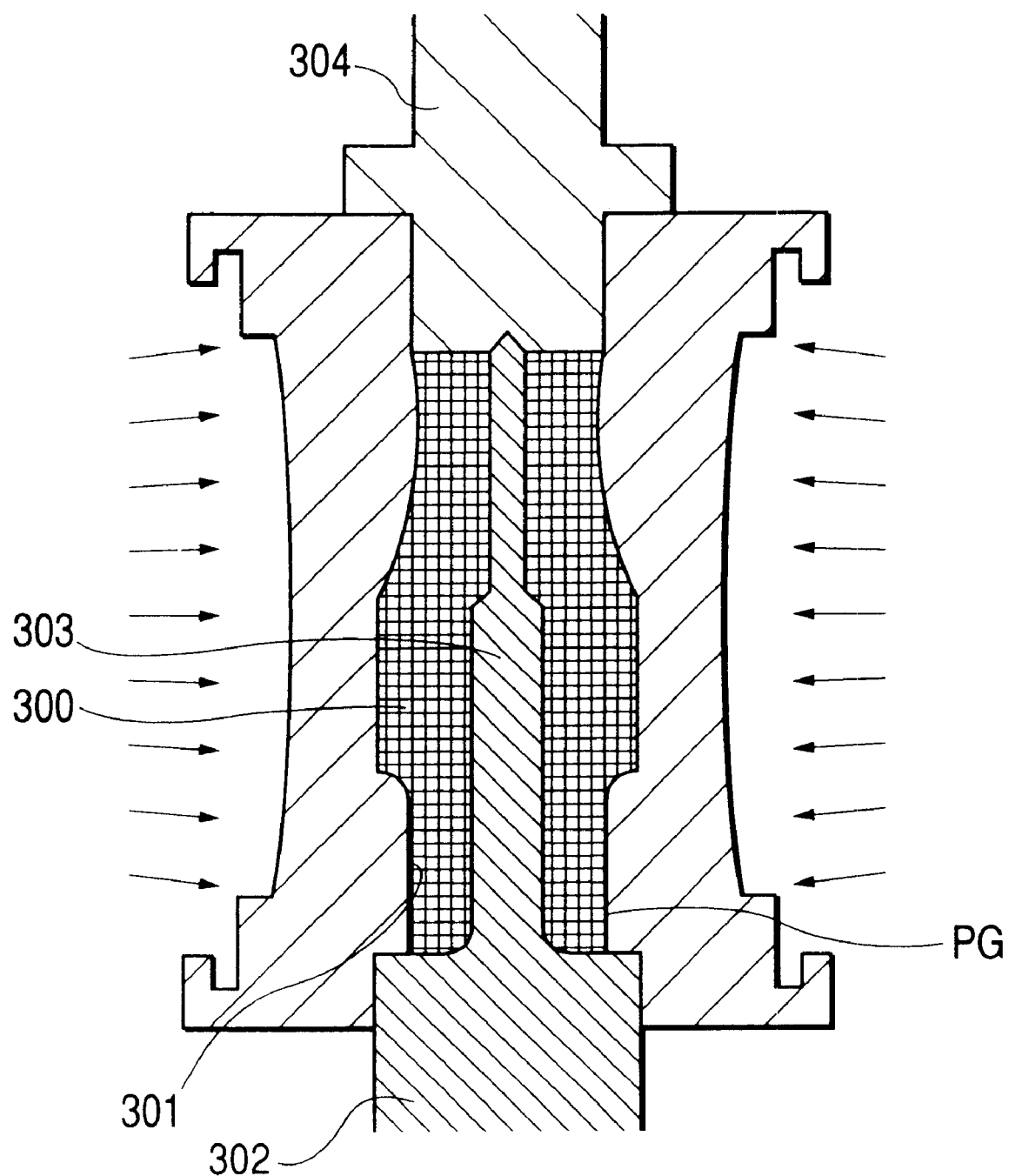
FIG. 9 illustrates a hydrostatic pressing method.

The resulting slurry is spray-dried into granules, and the granules are formed by hydrostatic pressing to obtain a green body. FIG. 9 schematically illustrates hydrostatic pressing, in which a rubber mold 300 having a cavity 301 piercing through the middle in the axial direction is used. A lower punch 302 is fitted into the lower opening of the cavity 301. The lower punch 302 integrally has a core pin 303 which projects through the cavity 301 and gives the shape of the through-hole 6 of the insulator 2 (see FIG. 1).

The cavity 301 is filled with a prescribed amount of the granules for pressing (PG), and the upper opening of the cavity 301 is stopped with an upper punch 304. In this state, a liquid pressure is applied to the outer periphery of the rubber mold 300 to compress the granules PG through the rubber mold 300 to obtain a green body 305. In order to accelerate disintegration of the granules PG into powder during pressing, 0.7 to 1.3 parts by weight of water has previously been added to 100 parts by weight of the granules PG. The green body 305 is finished by machining, such as grinding to the contour of the insulator 2 shown in FIG. 1 and then fired at 1400 to 1600° C. to obtain the insulator 2.

A glaze slurry of the first to sixth aspects of the present invention is prepared as follows. Raw material powders as sources of Si, B, Zn, Ba, Na, K, etc. (e.g., $SiO_2$ powder for the Si component, $H_3PO_3$ powder for the B component, ZnO powder for the Zn component, $BaCO_3$ powder for the Ba component, $Na_2CO_3$ powder for the Na component, and $K_2CO_3$ powder for the K component) are mixed according to a designed composition. The mixed powder is melted at 1000 to 1500° C. and poured into water for vitrification, followed by grinding to prepare a glaze frit. The glaze frit is mixed with appropriate amounts of a clay mineral, such as kaolin or gairome clay, and an organic binder, and water is added thereto to prepare a glaze slurry.

A glaze slurry of the seventh aspect of the present invention is prepared as follows. Raw material powders as sources of Si, B, Zn, Ba, Na, K, Mo, W, etc. (e.g., $SiO_2$ powder for the Si component, $H_3PO_3$ powder for the B component, ZnO powder for the Zn component, $BaCO_3$ powder for the Ba component, $Na_2CO_3$ powder for the Na component, $K_2CO_3$ powder for the K component, $MoO_3$ powder for the Mo component, and $WO_3$ powder for the W component) are mixed according to a designed composition. The mixed powder is melted at 1000 to 1500° C. and poured into water for vitrification, followed by grinding to prepare a glaze frit. The glaze frit is mixed with appropriate amounts of a clay mineral, such as kaolin or gairome clay, and an organic binder, and water is added thereto to prepare a glaze slurry.

Figure 10:
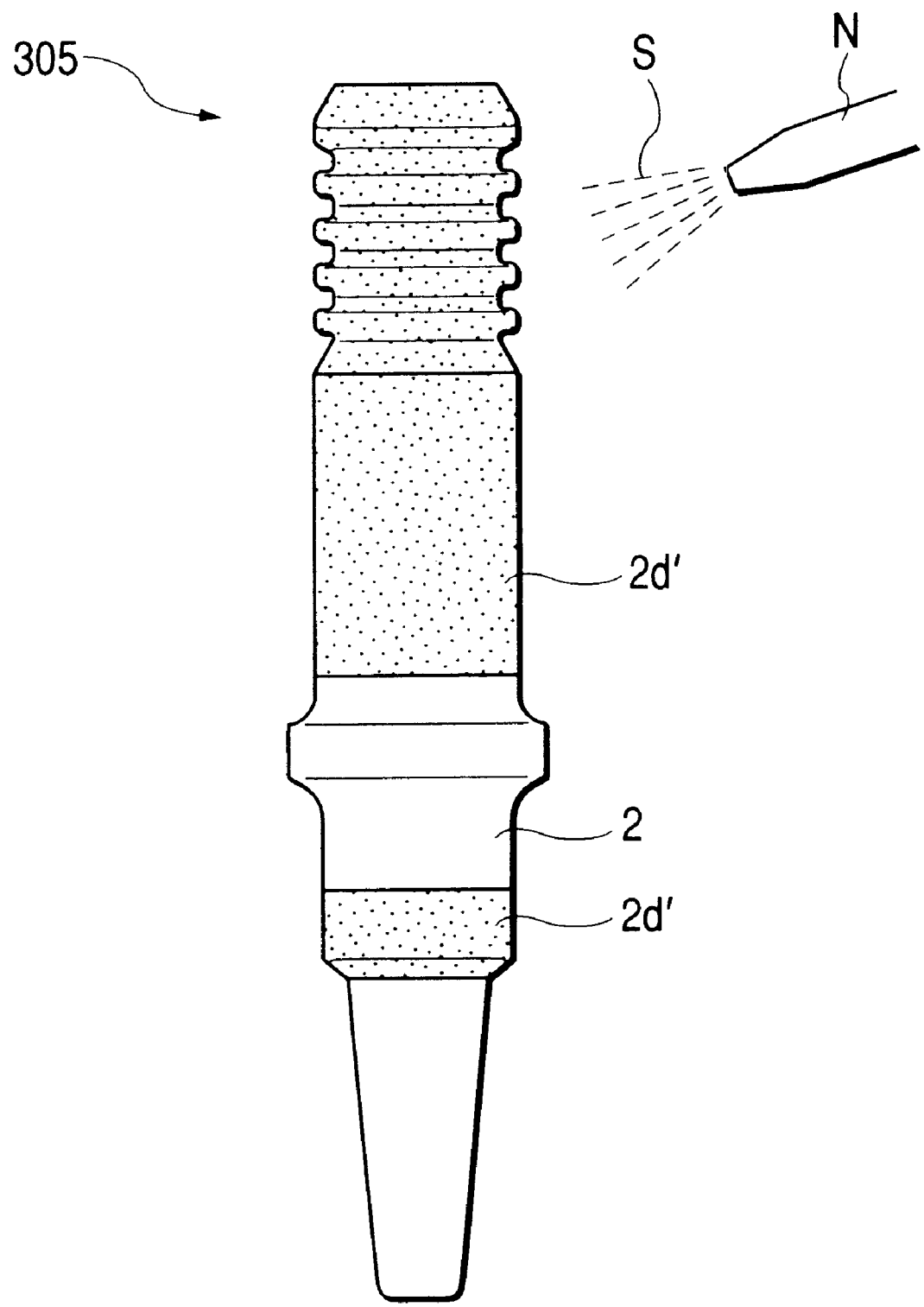
FIG. 10 illustrates the step of forming a coating layer of a glaze slurry.

As shown in FIG. 10, the glaze slurry S is sprayed on necessary parts of the insulator 2 from a spray nozzle N to form a coating layer 2d' as a glaze powder deposit.

Figure 11A:
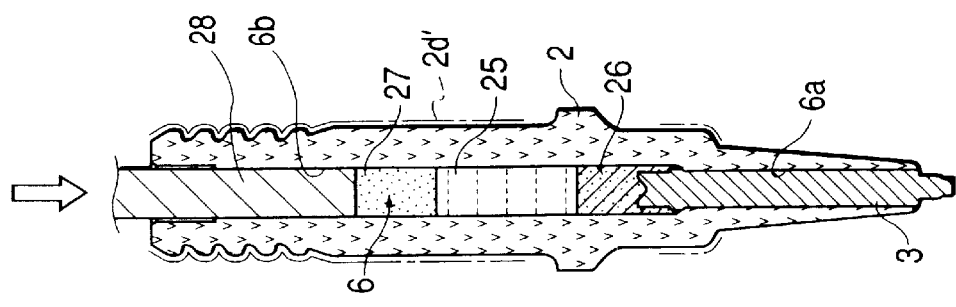
FIGS. 11A to 11D and 12A to 12B illustrate in sequence a glass sealing step.
Figure 11B:
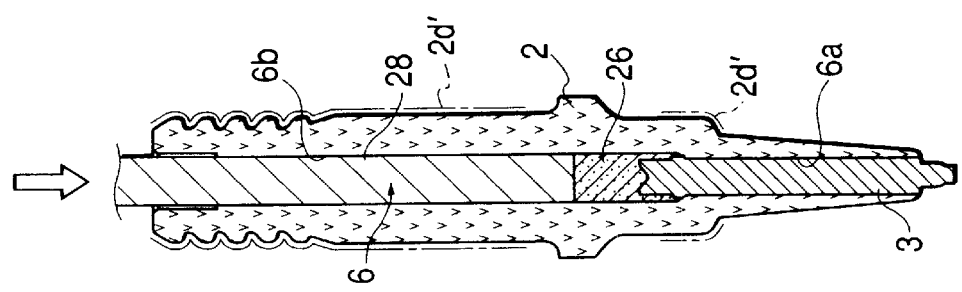
Figure 11C:
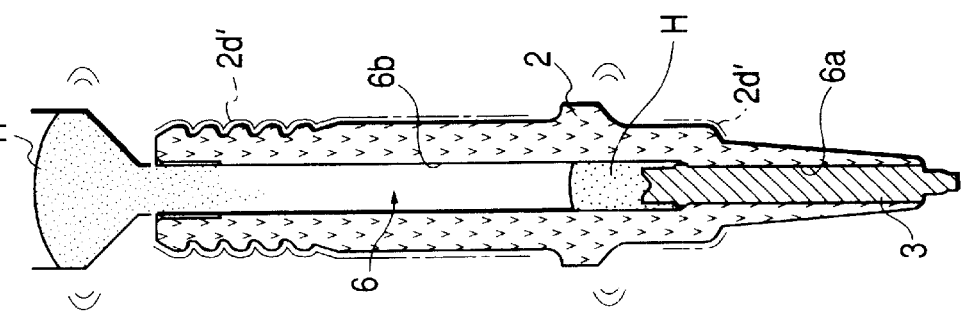
Figure 11D:
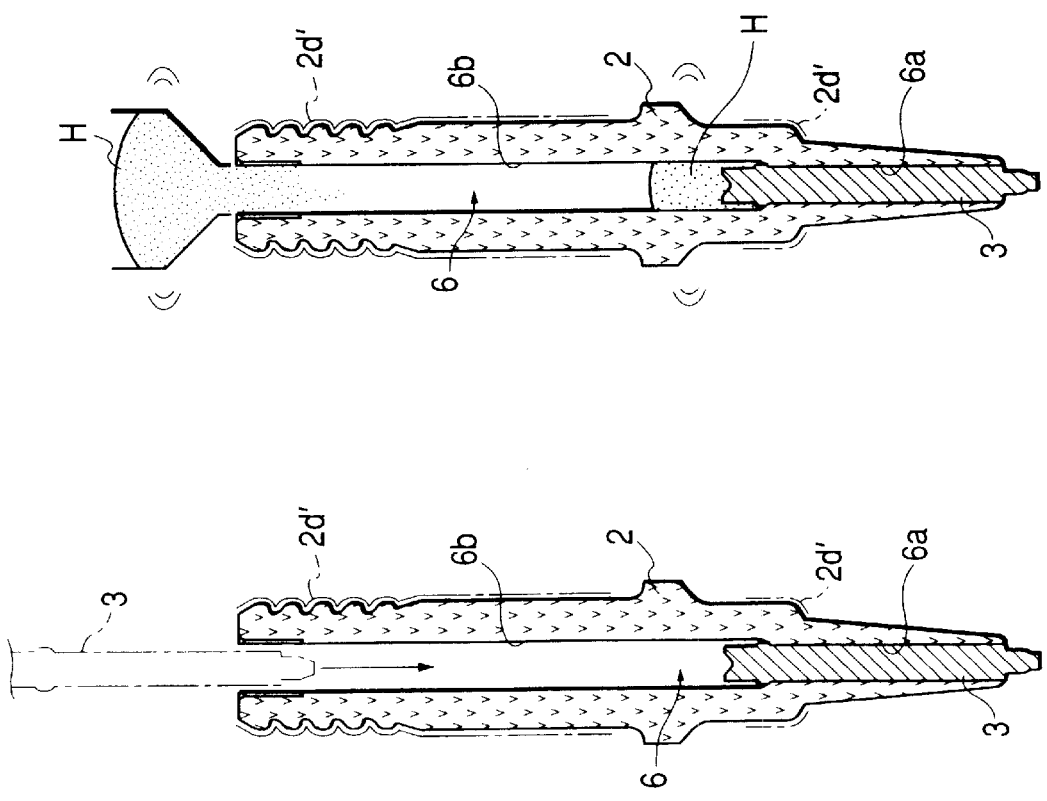

After the coating layer 2d' dries, a center electrode 3 and a terminal 13 are fitted into the through-hole 6 of the coated insulator 2, and a resistor 15 and conductive glass seal layers 16 and 17 are formed according to the sequential steps depicted in FIGS. 11A to 11D as follows. A center electrode 3 is inserted into the first portion 6a of the through-hole 6 (FIG. 11A). A conductive glass powder H is put on the center electrode 3 (FIG. 11B). The powder H is preliminary compressed by pressing with a press bar 28 inserted into the through-hole 6 to form a first conductive glass powder layer 26 (FIG. 11C). A raw material powder for a resistor composition is put thereon and preliminarily compressed in the same manner as in FIG. 11C. A conductive glass powder is again put thereon and preliminarily compressed in the same manner to build up in the through-hole 6 the first conductive glass powder layer 26, the resistor composition powder layer 25, and a second conductive glass powder layer 27 on the center electrode 3 in this order (FIG. 11D).

Figure 12A:
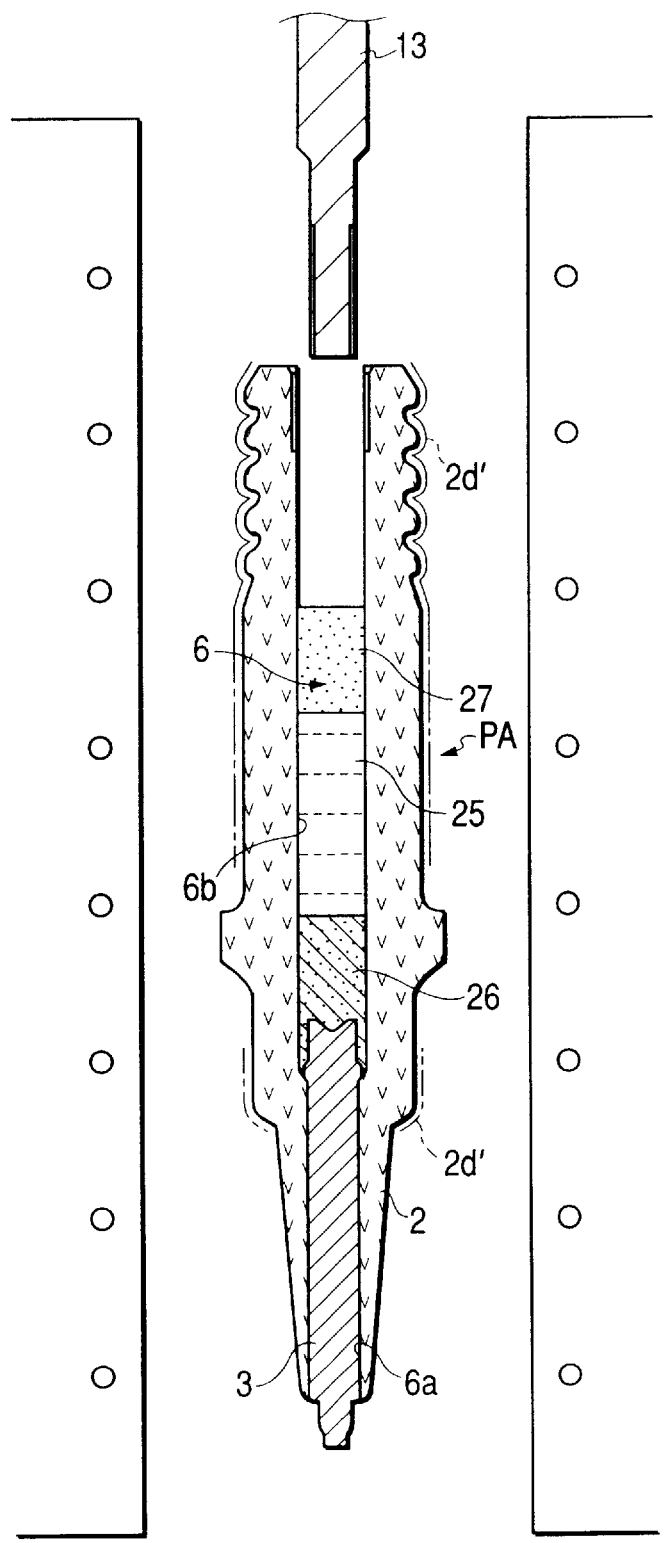
Figure 12B:
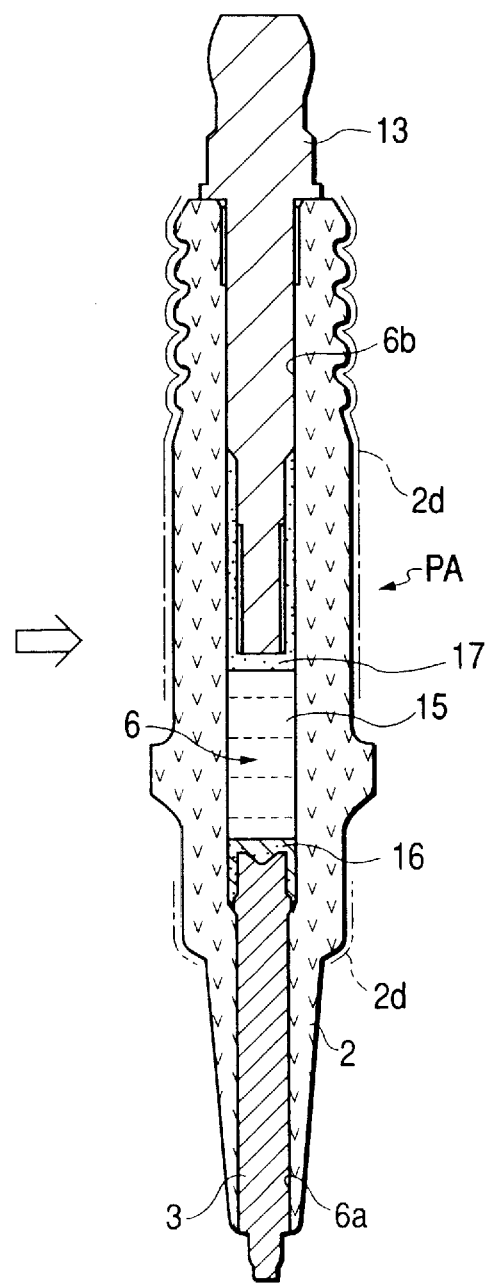

A terminal 13 is then disposed at the rear of the through-hole 6 as shown in FIG. 12A. The resulting structure PA is put into a heating furnace and heated at or above the glass softening point selected from a range of from 800 to 950° C., and the terminal 13 is pressed into the through-hole 6 from the rear end of the through-hole 6 in the axial direction to press the superposed layers 25 to 27. Thus, the layers 25 to 27 are each compressed and sintered to become a conductive glass seal layer 16, a resistor 15, and a conductive glass seal layer 17, respectively, to complete the glass sealing step (FIG. 12B).

When the softening point of the glaze frit constituting the coating layer 2d' is adjusted within a range of 600 to 700° C., the coating layer 2d' can be fired into the glaze layer 2d by the heat applied in the glass sealing step. Since the heating temperature of the glass sealing step is selected from a relatively low temperature range of from 800 to 950° C., oxidative damage to the center electrode 3 and the terminal 13 can be reduced.

When a burner type gas-firing furnace is used as a heating furnace (which also serves as a glaze firing furnace), the heating atmosphere contains relatively much steam as a combustion product. Even in such an atmosphere, the glaze according to the first or second aspect of the invention provides a smooth and homogeneous glade layer having satisfactory insulating properties.

After the glass sealing step, a metal shell 1, a ground electrode 4 and so forth are fitted on the structure PA to complete the spark plug 100 shown in FIG. 1. The spark plug 100 is screwed into an engine block using the thread 7 and used as a spark source to ignite an air/fuel mixture supplied to a combustion chamber. A high-tension cable or an ignition coil is connected to the spark plug 100 by means of a rubber cap RC made of, e.g., silicone rubber which covers the outer surface of the rear portion 2b of the insulator 2 as indicated by a chain line in FIG. 1. The rubber cap RC has a smaller hole diameter than the outer diameter D1 (FIGS. 4A and 4B) of the rear portion 2b by about 0.5 to 1.0 mm. The rear portion 2b is pressed into the rubber cap while elastically expanding the hole until it is covered therewith to its base. The rubber cap RC thus comes into intimate contact with the outer surface of the rear portion 2b to function as an insulating cover for preventing a flashover, etc. Since the smoothness of the glazed surface can be improved by using the glaze composition according to the present invention and by setting the thickness T1 of the glaze layer 2d within the range specified in the third or seventh aspect of the invention, the contact between the glazed surface and the rubber cap RC can be improved without reducing the insulating properties of the glaze layer 2d, which further leads to improvement in anti-flashover properties.

Figure 5:
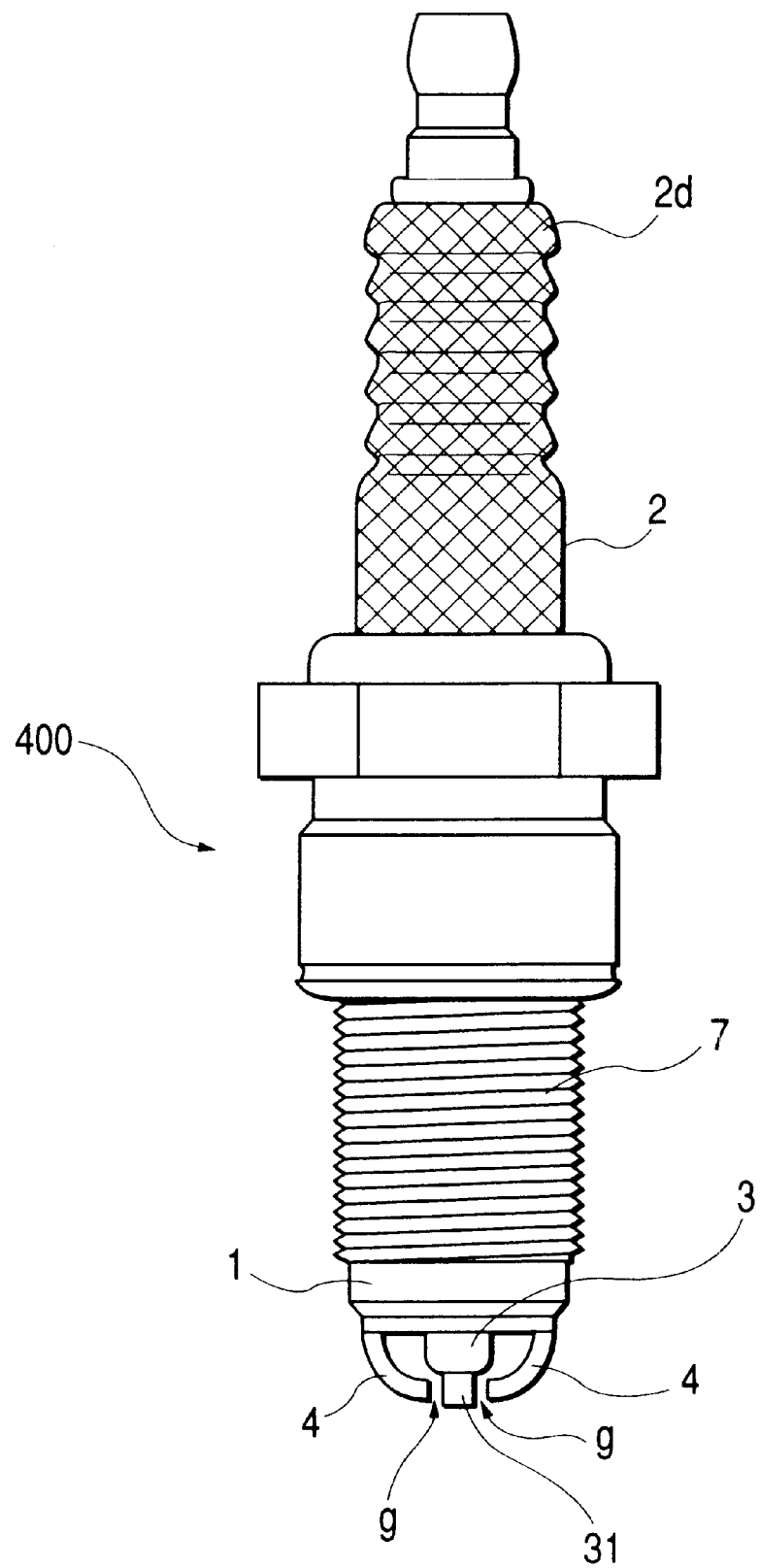
FIG. 5 is a front view of another spark plug according to the present invention.
Figure 6A:
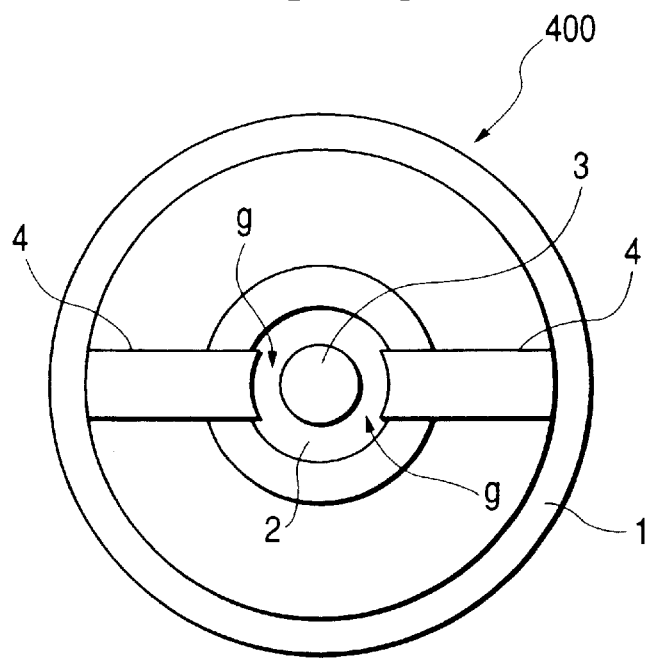
FIG. 6 shows a plan view of the sparking part of the spark plug shown in FIG. 5 and a plan view of its modification.
Figure 6B:
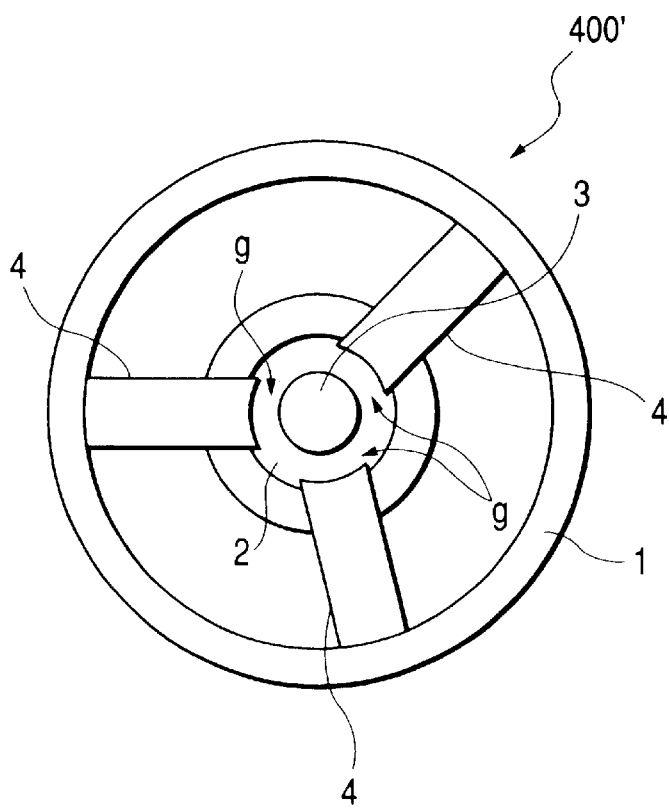
Figure 7:
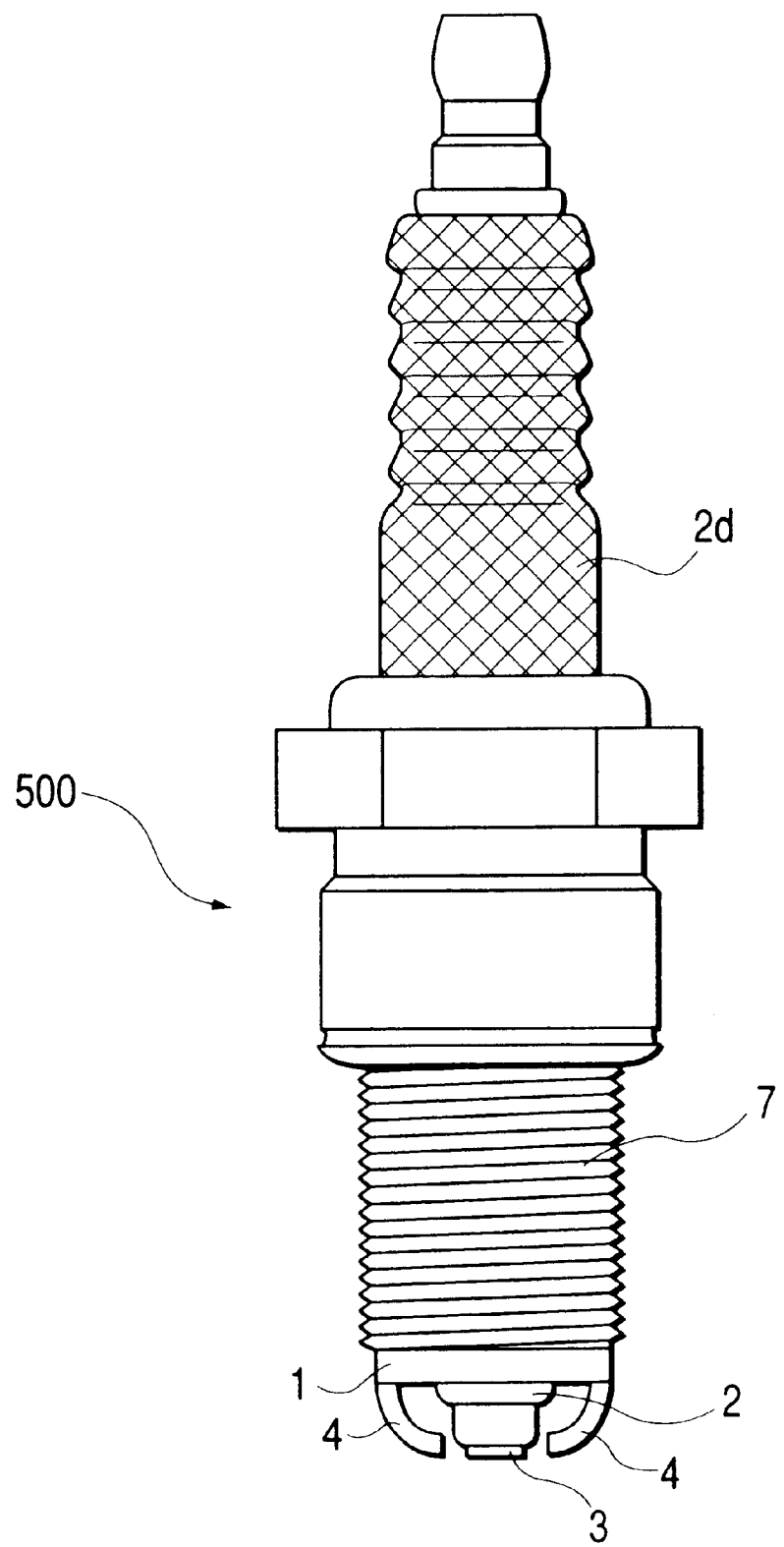
FIG. 7 is a front view of still another spark plug according to the present invention.

The spark plug of the present invention is not limited to the type shown in FIG. 1. For example, it can be of the type shown in FIG. 5, in which the tip of the ground electrode 4 is made to face the side of the center electrode 3 to form a gap g. The ground electrode 4 can be provided on each side of the center electrode 3 as shown in FIGS. 5 and 6A, or three or more ground electrodes 4 can be provided around the center electrode 3 as shown in FIG. 6B. A semi-planar discharge type spark plug as shown in FIG. 7 is also useful. In FIGS. 5 and 6A, 400 denotes a spark plug. In FIG. 6B, 400' denotes a spark plug. In FIG. 7, 500 denotes a spark plug. In this type, the tip of the insulator 2 extends between the side of the center electrode 3 and the tip surface of the ground electrode 4 so that a spark occurs along the surface of the tip of the insulator 2, which brings about improved anti-contamination properties over an aerial discharge type spark plugs.

The first through seventh aspect of the present invention can be carried out either individually or in combination of any two or more of them.

The following experimentation was carried out to confirm the effects of the present invention.

EXAMPLE 1

An insulator having the configuration of FIG. 1 was made as follows. An alumina powder (alumina content: 95 mol %; Na content (as $Na_2O$): 0.1 mol %; average particle size: 3.0 $\mu$m) was mixed in a prescribed mixing ratio with $SiO_2$ (purity: 99.5%; average particle size: 1.5 $\mu$m), $CaCO_3$ (purity: 99.9%; average particle size: 2.0 $\mu$m), MgO (purity: 99.5%; average particle size: 2 $\mu$m), $BaCO_3$ (purity: 99.5%; average particle size: 1.5 $\mu$m), $H_3BO_3$ (purity: 99.0%; average particle size: 1.5 $\mu$m), and ZnO (purity: 99.5%; average particle size: 2.0 $\mu$m). To 100 parts by weight of the resulting mixed powder were added 3 parts by weight of PVA and 103 parts by weight of water, and the mixture was kneaded to prepare a slurry.

The resulting slurry was spray-dried into spherical granules, which were sieved to obtain a fraction of from 50 to 100 $\mu$m. The granules were formed into a green body by hydrostatic pressing under a pressure of 50 MPa in accordance with the process described with reference to FIG. 9. The outer surface of the green body was machined with a grinder into a predetermined configuration and fired at 1550° C. to obtain an insulator 2. X-Ray fluorescence analysis revealed that the insulator 2 had the following composition.

Al component (as $Al_2O_3$): 94.9 mol %

Si component (as $SiO_2$) 2.4 mol %

Ca component (as CaO): 1.9 mol %

Mg component (as MgO): 0.1 mol %

Ba component (as BaO): 0.4 mol %

B component (as $B_2O_3$): 0.3 mol %

The insulator 2 had the following dimensions. Reference is made to FIG. 4A. L1=ca. 60 mm; L2=ca. 8 mm; L3=ca. 14 mm; D1=ca. 10 mm; D2=ca. 13 mm; D3=ca. 7 mm; D4=5.5 mm; D5=4.5 mm; D6=4 mm; D7=2.6 mm; t1=1.5 mm; t2=1.45 mm; t3=1.25 mm; and tA=1.35 mm. The length LQ (see FIG. 1) of the portion 2k of the insulator 2 which projects over the rear end of the metal shell 1 was 25 mm, and the length LP (see FIG. 1) of the portion 2k as measured along its profile (the outer contour in a vertical cross-section containing the center axial line O, beginning from the rear end of the metal shell 1, passing across the surface of the corrugations 2c, and stopping at the rear end of the insulator 2) was 29 mm.

Glaze slurries having different compositions were prepared as follows. An $SiO_2$ powder (purity: 99.5%), an $H_3BO_3$ powder, (purity: 98.5%), a ZnO powder (purity: 99.5%), a $BaCO_3$ powder (purity: 99.5%), an $Na_2CO_3$ powder (purity: 99.5%), a $K_2CO_3$ powder (purity: 99%), an $Li_2CO_3$ powder (purity: 99%), an MgO (purity: 99.5%), $ZrO_2$ (purity: 99.5%), an $Al_2O_3$ powder (purity: 99.5%), an $Fe_2O_3$ powder (purity: 99.0%), a $CaCO_3$ powder (purity: 99.8%), a $TiO_2$ powder (purity: 99.5%), an $SrCO_3$ powder (purity: 99%), $SnO_2$ powder (purity: 99%), an FeO powder (purity: 99%), an $MoO_3$ powder (purity: 99%), and a $WO_3$ powder (purity: 99%) were mixed up at a varied mixing ratio. The mixed powder was melted at 1000 to 1500° C., and the melt was poured into water for vitrification, followed by grinding in an alumina pot mill to powder (frit) of 50 μm or smaller size. Three parts by weight of New Zealand kaolin and 2 parts by weight of PVA as an organic binder were mixed into 100 parts by weight of the glaze frit, and the mixture was kneaded with 100 parts by weight of water to prepare a glaze slurry.

The glaze slurry was sprayed on the insulator 2 from a spray nozzle as illustrated in FIG. 10 and dried to form a glaze powder deposit 2d' having a deposit thickness of about 100 μm. Spark plugs 100 of FIG. 1 were produced by using the resulting insulator 2 with the glaze powder deposit 2d' in accordance with the process hereinabove described with reference to FIGS. 11 and 12. The outer diameter of the thread 7 was 14 mm. The resistor 15 was made from a mixed powder consisting of $B_2O_3$—$SiO_2$—BaO—$Li_2O$ glass powder, $ZrO_2$ powder, carbon black powder, $TiO_2$ powder, and metallic Al powder. The conductive glass seal layers 16 and 17 were made from a mixed powder consisting of $B_2O_3$—$SiO_2$—$Na_2O$ glass powder, Cu powder, Fe powder, and Fe—B powder. The heating temperature for glass sealing, i.e., the glaze firing temperature was set at 900° C. The thickness of the glaze layers 2d formed on the insulators 2 was around 20 μm.

Separately, the above-described glaze composition was melted and solidified to prepare a glaze sample in block form for various analyses described below. The resulting sample was confirmed by X-ray diffractometry to be in a vitrified (amorphous) state.

1) Chemical Composition Analysis

X-Ray fluorescence analysis was conducted. The results obtained, expressed in terms of oxide content, are shown in Tables 1 to 3 below. The analytical results obtained by EPMA on the glaze layer 2d as formed on the insulator were in good agreement with the results of X-ray fluorescence analysis.

2) Linear Expansion Coefficient α

A specimen (5 mm×5 mm×10 mm) was cut out of the block sample, and a linear expansion coefficient a was measured with a conventional dilatometer. The values measured in a temperature of from 20° C. up to 350° C. were averaged.

The same measurement was made on the same size of a specimen cut out of the insulator 2. As a result, the linear expansion coefficient was found to be $73 \times 10^{-7}$/° C.

3) Softening Point

A powder sample weighing 50 mg was subjected to DTA. Heating was started from room temperature. The second endothermic peak temperature was taken as a softening point.

Figure 8:
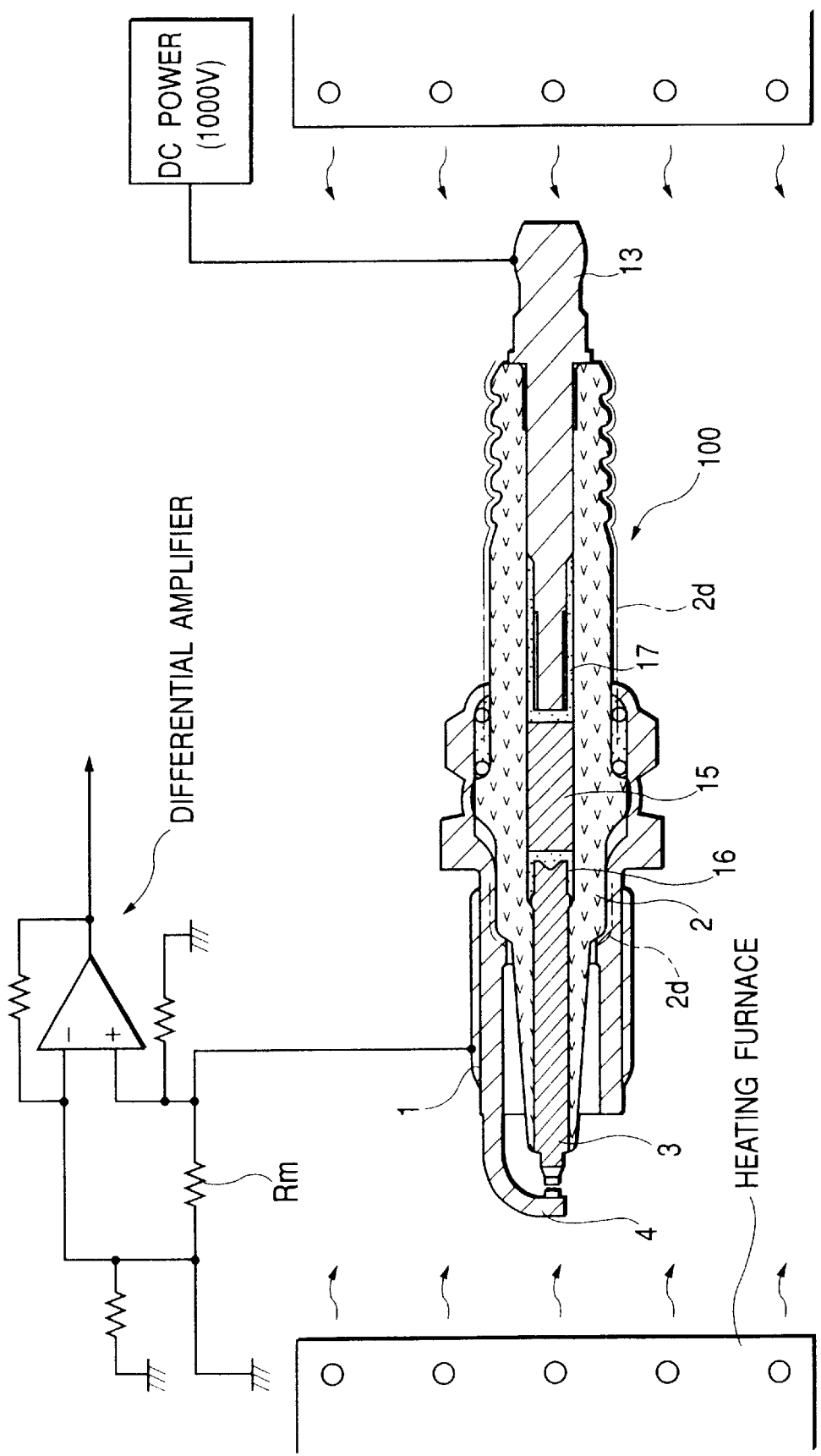
FIG. 8 illustrates a method of measuring an insulation resistance of a spark plug.

The spark plugs were evaluated in the method previously described (FIG. 8) to measure the insulation resistance Rx at 500° C. The applied voltage was 1000 V. Further, the appearance of the glaze layer 2d formed on the insulator 2 was observed with the naked eye. The results obtained are shown in Tables 1 to 3. The asterisk mark in Tables means "out of the scope of the present invention" (hereinafter the same).

TABLE 1

| | | Run No. | | | | | | | |
|---|---|---|---|---|---|---|---|---|---|
| | | 1 | 2 | 3 | 4 | 5 | 6 | 7 | 8 |
| Glaze Composition (mol %) | $SiO_2$ | 57 | 43 | 40 | 50 | 28 | 20 | 40 | 35 |
| | $B_2O_3$ | 26 | 38 | 27 | 23 | 16 | 15 | 25 | 25 |
| | ZnO | 6 | 6 | 8 | 5 | 9 | 5 | 8 | 7 |
| | BaO | 11 | 11 | 15 | 10 | 24 | 10 | 10 | 19 |
| | Subtotal[1] | 100 | 98 | 90 | 88 | 77 | 50 | 83 | 86 |
| | $Na_2O$ | — | 1 | 2 | 3 | 4 | 4 | 8 | 6 |
| | $K_2O$ | — | 1 | 2 | 2 | 4 | 4 | 6 | 3 |
| | $Li_2O$ | — | — | 1 | 1 | 3 | 3 | 2 | 1 |
| | Subtotal[2] | —* | 2 | 5 | 6 | 11 | 11 | 16* | 10 |
| | $Al_2O_3$ | — | — | 3 | 4 | 3 | — | 1 | 2 |
| | CaO | — | — | 2 | 2 | 3 | 17 | — | 2 |
| | SrO | — | — | — | — | 6 | 22 | — | — |
| | $Fe_2O_3$ | — | — | — | — | — | — | — | — |
| | $ZrO_2$ | — | — | — | — | — | — | — | — |
| | $TiO_2$ | — | — | — | — | — | — | — | — |
| | MgO | — | — | — | — | — | — | — | — |
| | $SnO_2$ | — | — | — | — | — | — | — | — |
| | Subtotal[3] | 11 | 11 | 17 | 12 | 33 | 49 | 10 | 21 |
| ZnO/(RO + ZnO) | | 0.35 | 0.35 | 0.32 | 0.41 | 0.21 | 0.13 | 0.44 | 0.25 |
| Softening Point (° C.) | | 720 | 680 | 670 | 680 | 650 | 630 | 600 | 620 |
| α ($\times 10^{-7}$/° C.) | | 62 | 65 | 66 | 67 | 69 | 72 | 71 | 69 |
| Rx (500° C.; MΩ) | | 1300 | 1100 | 1100 | 900 | 600 | 700 | 150* | 500 |
| Appearance | | Insufficient melting* | slightly insufficient melting | Good | Good | Good | slight cracking | Good | Good |

TABLE 2

| | | Run No. | | | | | | | |
|---|---|---|---|---|---|---|---|---|---|
| | | 9 | 10* | 11 | 12 | 13 | 14 | 15 | 16 |
| Glaze Composition (mol %) | $SiO_2$ | 21 | 63* | 60 | 25 | 38 | 40 | 40 | 50 |
| | $B_2O_3$ | 35 | 15 | 8 | 55 | 26 | 26 | 26 | 23 |
| | ZnO | 8 | 4 | 6 | 4 | — | 11 | 24 | 10 |
| | BaO | 25 | 5 | 7 | 5 | 15 | 13 | — | 5 |
| | Subtotal[1] | 89 | 86 | 81 | 89 | 79 | 90 | 90 | 88 |
| | $Na_2O$ | 2 | 4 | 4 | 2 | 4 | 2 | 2 | 3 |
| | $K_2O$ | 2 | 4 | 4 | 2 | 4 | 1 | 1 | 2 |
| | $Li_2O$ | 1 | 2 | 4 | 2 | 3 | 1 | 1 | 1 |
| | Subtotal[2] | 5 | 11 | 12 | 6 | 11 | 4 | 4 | 6 |
| | $Al_2O_3$ | 4 | 1 | 3 | 2 | 2 | 4 | 4 | 4 |
| | CaO | 2 | 1 | 2 | 3 | 2 | 2 | 2 | 2 |
| | SrO | — | 1 | 2 | — | 6 | — | — | — |
| | $Fe_2O_3$ | — | — | — | — | — | — | — | — |
| | $ZrO_2$ | — | — | — | — | — | — | — | — |
| | $TiO_2$ | — | — | — | — | — | — | — | — |
| | MgO | — | — | — | — | — | — | — | — |
| | $SnO_2$ | — | — | — | — | — | — | — | — |
| | Subtotal[3] | 27 | 7 | 11 | 8 | 23 | 15 | 2 | 7 |
| ZnO/(RO + ZnO) | | 0.23 | 0.36 | 0.4 | 0.33 | 0 | 0.42 | 0.93 | 0.58 |
| Softening Point (° C.) | | 640 | 710 | 690 | 620 | 650 | 670 | 690 | 680 |
| α (× $10^{-7}$/° C.) | | 69 | 64 | 65 | 67 | 64 | 66 | 65 | 66 |
| Rx (500° C.; MΩ) | | 800 | 700 | 700 | 900 | 700 | 1000 | 800 | 850 |
| Appearence | | Slight cracking | Insufficient melting* | Slightly insufficient melting | poor durability, devitrification | Slight crazing | Slight opacity | Slight devitrification | Slight opacity |

TABLE 3

| | | Run No. | | | | | | | |
|---|---|---|---|---|---|---|---|---|---|
| | | 17 | 18 | 19 | 20 | 21 | 22 | 23 | 24 |
| Glaze Composition (mol %) | $SiO_2$ | 50 | 39.9 | 39 | 39 | 39 | 39 | 39.5 | 38 |
| | $B_2O_3$ | 10 | 27 | 27 | 27 | 26 | 27 | 27 | 25 |
| | ZnO | 12 | 8 | 8 | 8 | 8 | 8 | 8 | 8 |
| | BaO | 15 | 15 | 15 | 15 | 15 | 15 | 15 | 15 |
| | Subtotal[1] | 87 | 89.9 | 89 | 89 | 88 | 89 | 89.5 | 86 |
| | $Na_2O$ | 3 | 2 | 2 | 2 | 2 | 2 | 2 | 2 |
| | $K_2O$ | 3 | 2 | 2 | 2 | 2 | 2 | 2 | 2 |
| | $Li_2O$ | 3 | 1 | 1 | 1 | 1 | 1 | 1 | 1 |
| | Subtotal[2] | 9 | 5 | 5 | 5 | 5 | 5 | 5 | 5 |
| | $Al_2O_3$ | 2 | 3 | 3 | 3 | 3 | 3 | 3 | 3 |
| | CaO | 2 | 2 | 2 | 2 | 2 | 2 | 2 | 2 |
| | SrO | — | — | — | — | — | — | — | — |
| | $Fe_2O_3$ | — | 0.1 | — | — | — | — | — | — |
| | $ZrO_2$ | — | — | 1.0 | — | 1.0 | — | — | — |
| | $TiO_2$ | — | — | — | 1.0 | 1.0 | — | — | — |
| | MgO | — | — | — | — | — | 1.0 | — | — |
| | $SnO_2$ | — | — | — | — | — | — | 0.5 | $MoO_3$ 4 |
| | Subtotal[3] | 17 | 17 | 17 | 17 | 17 | 17 | 17 | 17 |
| ZnO/(RO + ZnO) | | 0.41 | 0.32 | 0.32 | 0.32 | 0.32 | 0.32 | 0.32 | 0.32 |
| Softening Point (° C.) | | 640 | 670 | 670 | 670 | 670 | 670 | 670 | 675 |
| α (× $10^{-7}$/° C.) | | 70 | 66 | 66 | 66 | 66 | 66 | 66 | 66 |
| Rx (500° C.; MΩ) | | 600 | 1000 | 1000 | 1000 | 1000 | 1000 | 1000 | 1000 |
| Appearance | | slight opacity | good | good | Good | good | good | good | Good |

Note:
[1] Total content of main components ($SiO_2 + B_2O_3 + ZnO + BaO$)
[2] Total content of alkali metal components ($Na_2O + K_2O + Li_2O$)
[3] Total content of alkaline earth metal components (RO)

It can 3 R be seen from the results in Tables 1 to 3 that the selected glaze composition according to the first and second aspects of the present invention, while having substantially no lead, can be fired at a relatively low temperature to provide a glaze layer exhibiting sufficient insulating performance. The glazed surfaces generally have a satisfactory appearance.

EXAMPLE 2

An insulator 2 and glaze slurries having different compositions (see Table 4 below) were prepared in the same manner as in Example 1. The slurry was sprayed onto the insulator 2 as shown in FIG. 10 and dried to form a glaze powder deposit 2d'. The deposit thickness was adjusted to give a dry thickness of from 5 to 100 μm around the base of the rear portion 2b and of from 20 to 150 μm at the depths of the corrugations 2c as shown in Table 4. Spark plugs 100 of FIG. 1 were produced by using the resulting insulator 2 with the glaze powder deposit 2d' in accordance with the process hereinabove described with reference to FIGS. 11 and 12.

The insulation resistance Rx of the spark plugs was measured in the same manner as in Example 1. The appearance of the glaze layer 2d on the insulator 2 was observed with the naked eye. Further, a flash-over test was carried out as follows. The front part of the insulator 2 was covered with a silicon tube, etc. to prevent sparking at the spark gap g, and the spark plug 100 was fitted to a high-voltage chamber, and a high-voltage lead insulated with a vinyl resin, etc. was connected to the terminal 13 while covering the rear portion 2b of the insulator 2 with a silicon rubber cap RC as shown in FIG. 1. A voltage was applied to the spark plug 100 through the high-voltage lead. The applied voltage was increased at a rate of 0.1 to 1.5 kV/sec to measure the lowest voltage that caused a flashover (critical voltage). The anti-flashover properties of the spark plugs were rated as follows.

A . . . The critical voltage is 25 kV or higher.
B . . . The critical voltage is 15 to 25 kV.
C . . . The critical voltage is lower than 15 kV.

The results of the measurement and evaluation are shown in Table 4.

TABLE 4

| | | Run No. | | | | | | | | | |
|---|---|---|---|---|---|---|---|---|---|---|---|
| | | 30 | 31 | 32 | 33 | 34 | 35 | 36 | 37 | 38* | 39 |
| Glaze Composition (mol %) | $SiO_2$ | 40 | 40 | 40 | 40 | 40 | 10 | 50 | 53 | 62* | 20 |
| | $B_2O_3$ | 27 | 27 | 27 | 27 | 27 | 45 | 18.5 | 6 | 20 | 10 |
| | ZnO | 8 | 8 | 8 | 8 | 8 | 6 | 9 | 12 | 2 | 20 |
| | BaO | 15 | 15 | 15 | 15 | 15 | 33 | 17 | 7 | 2 | 20 |
| | Subtotal[1] | 90 | 90 | 90 | 90 | 90 | 94 | 94.5 | 78 | 86 | 70 |
| | $Na_2O$ | 2 | 2 | 2 | 2 | 2 | 2 | 1.5 | 4 | 2 | 2 |
| | $K_2O$ | 2 | 2 | 2 | 2 | 2 | 2 | 1.5 | 4 | 2 | 3 |
| | $Li_2O$ | 1 | 1 | 1 | 1 | 1 | 1 | 1.5 | — | 2 | — |
| | Subtotal[2] | 5 | 5 | 5 | 5 | 5 | 5 | 4.5 | 8 | 6 | 5 |
| | $Al_2O_3$ | 3 | 3 | 3 | 3 | 3 | — | 1.0 | — | 8 | — |
| | CaO | 2 | 2 | 2 | 2 | 2 | — | — | 4 | — | 20 |
| | SrO | — | — | — | — | — | — | — | 2 | — | 5 |
| | MgO | — | — | — | — | — | — | — | 2 | — | — |
| | $ZrO_2$ | — | — | — | — | — | — | — | 1 | — | — |
| | $TiO_2$ | — | — | — | — | — | — | — | 5 | — | — |
| Glaze Thickness (μm) | Base | 5 | 10 | 20 | 40 | 100 | 20 | 20 | 20 | 20 | 20 |
| | Corrugations | 20 | 30 | 50 | 80 | 150 | 50 | 50 | 50 | 50 | 50 |
| Rx at 500° C. (MΩ) | | 1350 | 1300 | 1200 | 1000 | 750 | 1000 | 800 | 900 | 700 | 1000 |
| Appearance | | good | Good | Good | good | good | Slight cracking | Good | slightly insufficient melting | Insufficient melting | Cracking |
| Anti-flashover Properties | | C | B | A | A | poor fit of rubber cap | A | A | A | A | A |

As can be seen from Table 4, when the glaze layer thickness around the base of the rear portion 2b of the insulator is 7 μm or greater, the fit to a rubber cap is improved to improve the anti-flashover properties.

EXAMPLE 3

An insulator 2 and glaze slurries having different compositions (see Table 5 below) were prepared in the same manner as in Example 1. The slurry was sprayed onto the insulator 2 as shown in FIG. 10 and dried to form a glaze powder deposit 2d'. Spark plugs 100 of FIG. 1 were produced by using the resulting insulator 2 with the glaze powder deposit 2d' in accordance with the process hereinabove described with reference to FIGS. 11 and 12. The softening point and the linear expansion coefficient α of the glaze, the insulation resistance Rx (at 500° C.) of the spark plug were measured in the same manner as in Example 1. The appearance of the glaze layer was evaluated with the naked eye. The thickness of the glaze layer at the base of the rear portion 2b of the insulator was measured.

Figure 14:
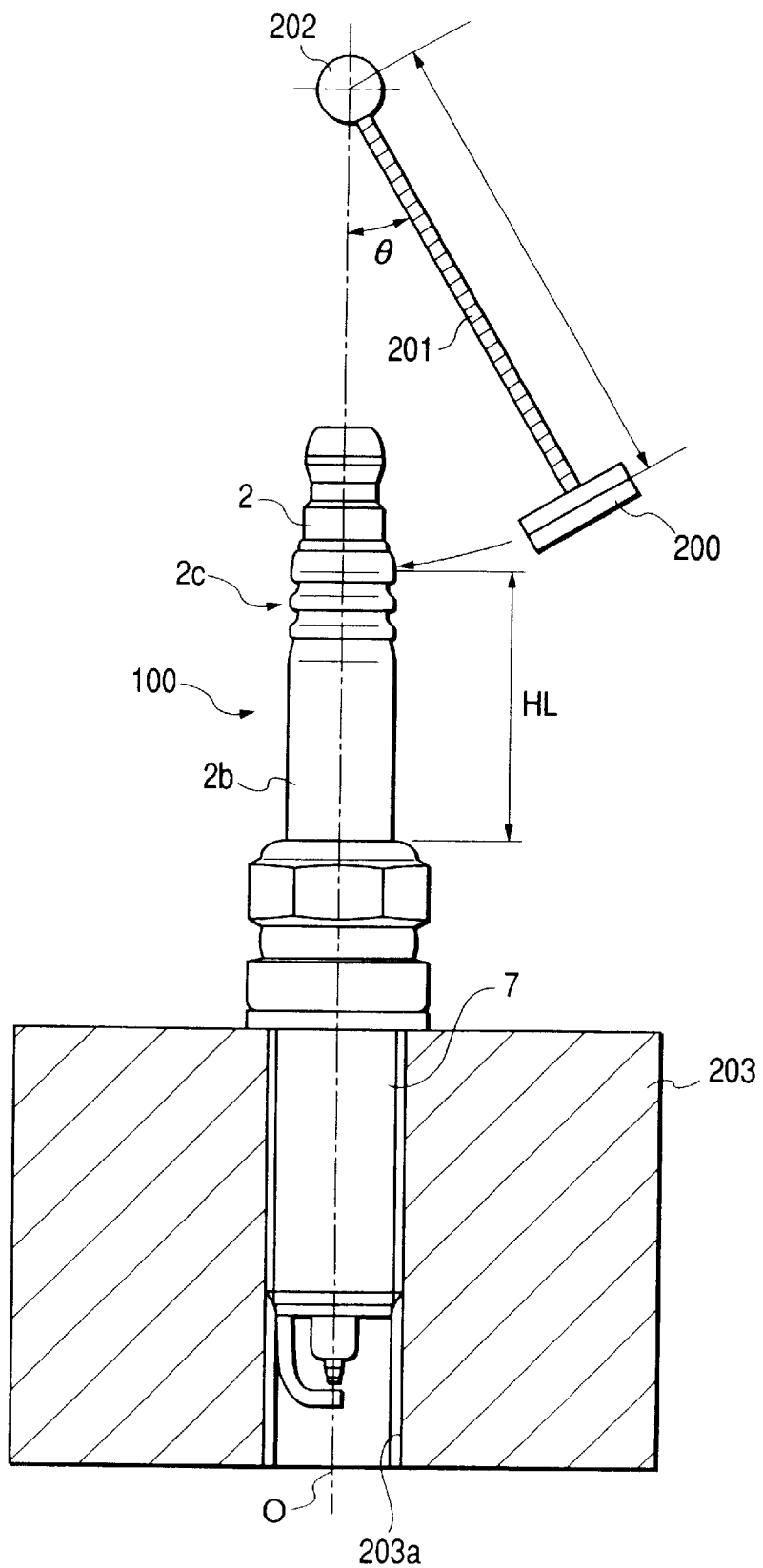
FIG. 14 illustrates a method of measuring an impact-resistance angle.

Further, the following pendulum impact test was carried out. As shown in FIG. 14, each spark plug was screwed into a hole 203a of a mount 203 to make the rear portion 2b of the insulator 2 project upright. A pendulum having a 330 mm long arm 201 and a steel striker 200 weighing 1.13 kg at the tip thereof was set so as to be allowed to swing on its support (shoulder) 202. The support 202 was on the center axial line O of the insulator 2 and above the rear end of the insulator 2 at such a height that the striker 200 struck 1 mm vertically below the rear end of the insulator (the first spline of the corrugations c, counted from the rear end of the rear portion 2c). The pendulum was allowed to swing through a pre-scribed angle θ from the vertical repeatedly while increasing the angle θ stepwise by 2° until the insulator was broken. The critical angle θ at which the insulator was broken is taken as an impact-resistance angle θ.

The results of the above measurements and evaluations are shown in Table 5.

TABLE 5

| | | Run No. | | | | | | | | |
|---|---|---|---|---|---|---|---|---|---|---|
| | | 1 | 2 | 3 | 4 | 5 | 6 | 7 | 8 | 9 |
| Glaze Composition (mol %) | $SiO_2$ | 47 | 47 | 35 | 35 | 35 | 40 | 28 | 30 | 38 |
| | $B_2O_3$ | 23 | 23 | 28 | 28 | 28 | 38 | 38 | 25 | 29.5 |
| | ZnO | 5 | 5 | 4 | 4 | 4 | 4 | 8 | 2 | 9 |
| | BaO | 10 | 2 | 20 | 0.2 | 10 | 1 | 0.3 | 4 | 2 |
| | SrO | 2 | 10 | 0.2 | 20 | 10 | 4 | 4 | 23 | 10 |
| | $Na_2O$ | 3 | 3 | 2 | 2 | 2.5 | 2 | 3 | 2 | 2 |
| | $K_2O$ | 2 | 2 | 2 | 2 | 4 | 4 | 7 | 3 | 4 |
| | $Li_2O$ | 1 | 1 | 4 | 4 | 3 | 3 | 5 | 4 | 4 |
| | $Al_2O_3$ | 4 | 4 | 1.3 | 1.3 | 1 | 2 | 0.7 | 1 | — |
| | CaO | 2 | 2 | — | — | — | — | 1 | 2 | — |
| | $MoO_3$ | — | — | 0.5 | 0.5 | 0.5 | 0.5 | — | 2 | — |
| | MgO | — | — | — | — | — | — | 2 | 2 | — |
| | FeO | — | — | 1 | 1 | — | — | — | — | 0.5 |
| | $ZrO_2$ | 1 | 1 | 2 | 2 | 1 | — | 2 | — | 1 |
| | $TiO_2$ | — | — | — | — | 1 | 1.5 | 1 | — | — |
| Total | | 100 | 100 | 100 | 100 | 100 | 100 | 100 | 100 | 100 |
| BaO + SrO | | 12 | 12 | 20.2 | 20.2 | 20 | 5 | 4.3 | 27 | 12 |
| ZnO + BaO + SrO | | 17 | 17 | 24.2 | 24.2 | 24 | 9 | 12.3 | 29 | 21 |
| ZnO/(BaO + SrO) | | 0.42 | 0.42 | 0.20 | 0.20 | 0.80 | 0.80 | 1.86 | 0.07 | 0.75 |
| Softening Point (° C.) | | 680 | 680 | 650 | 650 | 650 | 690 | 630 | 680 | 630 |
| α (× $10^{-7}$/° C.) | | 67 | 65 | 76 | 72 | 74 | 69 | 80 | 87 | 73 |
| Rx at 500° C. (MΩ) | | 900 | 900 | 600 | 600 | 600 | 500 | 200 | 1000 | 600 |
| Impact-resistance Angle θ (°) | | 50 | 53 | 42 | 48 | 46 | 38 | 34 | 30 | 48 |
| Appearance | | Good | good | Good | Good | good | Insufficient melting | slight de-vitrification | Crimping | slight de-vitrification |
| Thickness (μm) | | 30 | 40 | 20 | 20 | 30 | 40 | 10 | 80 | 25 |

It can be seen from Table 5 that the glaze composition which satisfies (i) 4NBaO≦NSrO or (ii) 10 (mol %)≦NZnO+NBaO+NSrO≦30 (mol %) and NZnO/(NBa+NSrO)≦0.7 provides a glazed insulator having an impact-resistance angle of 35° or greater while exhibiting satisfactory insulating resistance at 500° C. and a satisfactory appearance.

EXAMPLE 4

An insulator having the configuration of FIG. 1 was made as follows. An alumina powder (alumina content: 95 mol %; Na content (as $Na_2O$): 0.1 mol %; average particle size: 3.0 μm) was mixed in a prescribed mixing ratio with $SiO_2$ (purity: 99.5%; average particle size: 1.5 μm), $CaCO_3$ (purity: 99.9%; average particle size: 2.0 μm), MgO (purity: 99.5%; average particle size: 2 μm), $BaCO_3$ (purity: 99.5%; average particle size: 1.5 μm), $H_3BO_3$ (purity: 99.0%; average particle size: 1.5 μm), and ZnO (purity: 99.5%; average particle size: 2.0 μm). To 100 parts by weight of the mixed powder were added 3 parts by weight of PVA and 103 parts by weight of water, and the mixture was kneaded to prepare a slurry.

The glaze compositions in Tables 6 and 7 were prepare in the same manner as in Example 1 using the above slurry, and evaluated in the same manner as in Example 1.

The results obtained are shown in Tables 6 and 7. The asterisk mark in Tables means "out the scope of the present invention".

TABLE 6

| | | Run No. | | | | | | | | | |
|---|---|---|---|---|---|---|---|---|---|---|---|
| | | 25 | 26 | 27 | 28 | 29* | 30 | 31 | 32 | 33 | 34 |
| Glaze Composition (mol %) | $SiO_2$ | 32.5 | 27.2 | 27.2 | 17.5 | 4.3* | 19.5 | 28.0 | 25.2 | 27.2 | 25.9 |
| | $B_2O_3$ | 30.0 | 36.7 | 39.5 | 38.5 | 59.9* | 30.0 | 17.0 | 29.5 | 30.5 | 49.0 |
| | ZnO | 13.6 | 13.7 | 7.5 | 13.7 | 23.9 | 33.9 | 23.5 | 13.7 | 13.7 | 6.5 |
| | BaO | 11.6 | 11.6 | 14.5 | 19.6 | 5.5 | 5.5 | 18.6 | 11.6 | 11.6 | 6.5 |
| | $Na_2O$ | 2.4 | 2.4 | 2.4 | 2.4 | 2.4 | 2.4 | 2.4 | 5.5 | 4.5 | 4.0 |
| | $K_2O$ | 1.0 | 1.0 | 1.0 | 1.0 | 1.2 | 1.2 | 1.2 | 5.0 | 4.0 | 3.5 |
| | $Li_2O$ | 2.1 | 2.1 | 2.1 | 2.1 | 0.5 | 2.1 | 2.1 | 4.0 | 3.5 | 2.5 |
| | $Al_2O_3$ | 3.0 | 1.4 | 1.4 | 1.4 | 1.5 | 1.5 | 3.0 | 1.4 | 1.4 | — |
| | CaO | 1.9 | 1.9 | 1.9 | 1.9 | — | 1.9 | 1.9 | 1.9 | 1.9 | — |
| | SrO | — | — | — | — | — | — | — | — | — | — |
| | $MoO_3$ | 2.0 | 2.0 | 2.0 | 2.0 | 2.0 | 2.0 | 2.0 | 2.0 | 2.0 | 2.0 |
| | $WO_3$ | — | — | — | — | — | — | — | — | — | — |
| Total | | 100 | 100 | 100 | 100 | 100 | 100 | 100 | 100 | 100 | 100 |
| $SiO_2/B_2O_3$ | | 1.08 | 0.75 | 0.70 | 0.45 | 0.07 | 0.66 | 0.07 | 0.86 | 0.90 | 0.54 |
| $R_2O/B_2O_3$ | | 0.18 | 0.15 | 0.14 | 0.14 | 0.07 | 0.18 | 0.33 | 0.49 | 0.39 | 0.20 |
| α (× $10^{-7}$/° C.) | | 65 | 75 | 72 | 70 | 82 | 70 | 85 | 83 | 72 | 55 |

TABLE 6-continued

| | Run No. | | | | | | | | | |
|---|---|---|---|---|---|---|---|---|---|---|
| | 25 | 26 | 27 | 28 | 29* | 30 | 31 | 32 | 33 | 34 |
| Rx (500° C.; MΩ) | 1300 | 1200 | 1000 | 700 | 300* | 1000 | 600 | 400 | 500 | 700 |
| Appearance | Good | good | good | good | slight opacity, insufficient durability | slight opacity | Slight crazing | good | Good | Good |

TABLE 7

| | | Run No. | | | | | | | | |
|---|---|---|---|---|---|---|---|---|---|---|
| | | 35 | 36* | 37 | 38 | 39 | 40 | 41 | 42 | 43* |
| Glaze Composition (mol %) | $SiO_2$ | 62.2* | 29.2 | 20.2 | 28.2 | 28.2 | 25.5 | 28.2 | 28.2 | 25.2 |
| | $B_2O_3$ | 2.0* | 36.2 | 24.5 | 32.7 | 32.7 | 28.7 | 35.7 | 32.7 | 30.7 |
| | ZnO | 23.9 | 13.7 | 8.7 | 13.7 | 13.7 | 13.7 | 13.7 | 13.7 | 13.7 |
| | BaO | 5.5 | 11.6 | 11.6 | 11.6 | 11.6 | 11.6 | 11.6 | 11.6 | 11.6 |
| | $Na_2O$ | 2.4 | 2.4 | 10.5* | 2.4 | 2.4 | 2.4 | 2.4 | 2.4 | 2.4 |
| | $K_2O$ | 1.2 | 1.0 | 10.0* | 1.0 | 1.0 | 1.0 | 1.0 | 1.0 | 1.0 |
| | $Li_2O$ | 0.5 | 2.1 | 9.0* | 2.1 | 2.1 | 2.1 | 2.1 | 2.1 | 2.1 |
| | $Al_2O_3$ | 1.5 | 1.4 | 1.4 | 1.4 | 1.4 | 1.4 | 1.4 | 1.4 | 1.4 |
| | CaO | — | 1.9 | 1.9 | 1.9 | 1.9 | 1.9 | 1.9 | 1.9 | 1.9 |
| | SrO | — | — | — | — | — | 12.0 | — | — | — |
| | $MoO_3$ | 2.0 | —* | 2.0 | — | 2.5 | 2.0 | 2.0 | 5.0 | 10.0* |
| | $WO_3$ | — | —* | — | 5.0 | 2.5 | — | — | — | — |
| Total | | 100 | 100 | 100 | 100 | 100 | 100 | 100 | 100 | 100 |
| $SiO_2/B_2O_3$ | | 31.1 | 0.81 | 1.21 | 0.86 | 0.86 | 0.89 | 0.79 | 0.86 | 0.82 |
| $R_2O/B_2O_3$ | | 2.05 | 0.15 | 1.2 | 1.07 | 0.17 | 0.19 | 0.15 | 0.17 | 0.18 |
| α (× $10^{-7}$/° C.) | | 75 | 70 | 79 | 60 | 60 | 85 | 65 | 68 | 72 |
| Rx (500° C.; MΩ) | | 1000 | 800 | 100* | 1000 | 1000 | 800 | 1100 | 1200 | 1000 |
| Appearance | | Insufficient melting | rough surface* | Good | Good | Good | slight crazing | Very good | very good | Insufficient melting* |

It can be seen from Tables 6 and 7 that the selected glaze composition of the invention can be fired at a relatively low temperature to provide a glaze layer which, while substantially free from Pb, exhibits sufficient insulating performance. It is also understood that choosing an adequate amount of a W or Mo component as an essential transition metal component makes the glazed surface excellent in appearance.

What is claimed is:

1. A spark plug comprising:
   a center electrode;
   a metal shell; and
   an alumina ceramic insulator disposed between said center electrode and said metal shell, with at least part of the surface of said insulator being coated with a glaze layer comprising oxides,
   wherein said glaze layer comprises:
   1 mol % or less, in terms of PbO, of a lead component,
   25 to 60 mol %, in terms of $SiO_2$, of a silicon component;
   10 to 40 mol %, in terms of $B_2O_3$, of a boron component;
   0.5 to 9.5 mol % of ZnO, of a zinc component;
   5 to 25 mol %, in terms of BaO, of a barium component,
   the total content of said silicon component, said boron component, said zinc component, and said barium component being 60 to 98 mol % in terms of the respective oxides,
   the total content of said zinc component and said barium compound being 9 to 30 mol % in terms of the respective oxides; and
   2 to 15 mol % of at least one alkali metal component selected from a sodium component, a potassium component, and a lithium component in terms of $Na_2O$, $K_2O$ or $Li_2O$.

2. A spark plug comprising:
   a center electrode, a metal shell; and
   an alumina ceramic insulator disposed between said center electrode and said metal shell, wherein at least part of the surface of said insulator is coated with a glaze layer comprising oxides,
   wherein said glaze layer comprises:
   1 mol % or less, in terms of PbO, of a lead component;
   25 to 60 mol %, in terms of $SiO_2$, of a silicon component;
   10 to 40 mol %, in terms of $B_2O_3$, of a boron component;
   1.5 to 20 mol %, in terms of ZnO, of a zinc component;
   5 to 25 mol %, in terms of BaO, of a barium component,
   the total content of said silicon component, said boron component, said zinc component, and said barium component being 60 to 98 mol % in terms of the respective oxides,
   the total content of said zinc component and said barium compound being 9 to 30 mol % in terms of the respective oxides,
   the content of said boron component, taken as NB2O3 (mol %), the content of said zinc component, taken as NZnO (mol %), and the content of said barium component, taken as NBaO (mol %), in terms of said respective oxides, satisfying the relationships:
   NB2O3>NZnO and NBaO>NznO; and 2 to 15 mol % of at least one alkali metal component selected from a sodium component, a potassium component, and a lithium component in terms of Na$_2$O, K$_2$O or Li$_2$O.

3. The spark plug according to claim 2, wherein the composition of said glaze layer satisfies the relationship: NB2O3>NBaO>NZnO.

4. The spark plug according to claim 2, wherein said glaze layer comprises 3 to 9.5 mol %, in terms of ZnO, of said zinc component.

5. The spark plug according to claim 1 or 2, wherein said glaze layer comprises an alkaline earth metal R component, wherein R is at least one of calcium, strontium and barium, at a content NRO (mol %) of more than 10 mol % in terms of the respective oxides RO, and said content RNO and the content of said zinc component in terms of ZnO, taken as NZnO (mol %), satisfy the relationship:

0.1≦NZnO/(NRO+NZnO)≦0.4.

6. The spark plug according to claim 1 or 2, wherein said insulator has an outwardly projecting portion on its periphery at the middle in the axial direction, the portion of said insulator which is in the rear of said projecting portion, the tip of said center electrode being taken as the front, has a cylindrical shape at the base thereof adjoining said projecting portion, and said glaze layer is formed to cover said cylindrical shape with a thickness of 7 to 50 μm.

7. A spark plug comprising:
a center electrode;
a metal shell; and
an alumina ceramic insulator disposed between said center electrode and said metal shell, with at least part of the surface of said insulator being coated with a glaze layer comprising oxides,
wherein said glaze layer comprises:
1 mol % or less, in terms of PbO, of a lead component,
35 to 80 mol % of a first component consisting of, based on the total glaze, 5 to 60 mol %, in terms of SiO$_2$, of a silicon component and 3 to 50 mol %, in terms of B$_2$O$_3$, of a boron component,
5 to 60 mol % of a second component consisting of at least one of a zinc component and an alkaline earth metal R component, wherein R is at least one member selected from calcium, strontium and barium, the content of said zinc component and said R component being expressed in terms of ZnO and RO, respectively,
the total content of said first component and said second component being 65 to 98 mol %, and
2 to 15 mol % of at least one alkali metal component selected from a sodium component, a potassium component, and a lithium component in terms of Na$_2$O, K$_2$O or Li$_2$O;
said insulator has an outwardly projecting portion on its periphery at the middle in the axial direction, the portion of said insulator which is in the rear of said projecting portion, the tip of said center electrode being taken as the front, has a cylindrical shape at the base thereof adjoining said projecting portion, and said glaze layer is formed to cover said cylindrical shape with a thickness of 7 to 50 μm.

8. The spark plug according to claim 7, wherein said second component comprises, based on the total glaze composition, 0.5 to 20 mol %, in terms of ZnO, of a zinc component and 5 to 55 mol %, in terms of BaO, of a barium component.

9. The spark plug according to claim 1, 2, or 7, wherein said glaze layer comprises at least one of 0.5 to 10 mol %, in terms of Al$_2$O$_3$, of an aluminum component, 0.5 to 10 mol %, in terms of CaO, of a calcium component, and 0.5 to 30 mol %, in terms of SrO, of a strontium component, the total content of said aluminum component, said calcium component and said strontium component being 0.5 to 30 mol % in terms of the respective oxides.

10. A spark plug comprising:
a center electrode;
a metal shell; and
an alumina ceramic insulator disposed between said center electrode and said metal shell, with at least part of the surface of said insulator being coated with a glaze layer comprising oxides,
wherein said glaze layer comprises:
1 mol % or less, in terms of PbO, of a lead component;
25 to 60 mol %, in terms of SiO$_2$, of a silicon component;
10 to 40 mol %, in terms of B$_2$O$_3$, of a boron component;
0.5 to 9.5 mol %, in terms of ZnO, of a zinc component;
0.1 mol % or more, in terms of BaO, of a barium component;
0.1 mol % or more, in terms of SrO, of a strontium component,
the total content of said barium component and said strontium component being 5 to 25 mol % in terms of the respective oxides,
the total content of said silicon component, said boron component, said zinc component, said barium component, and said strontium component being 60 to 98 mol % in terms of the respective oxides,
the content of said barium component as BaO, taken as NBaO (mol %), and the content of said strontium component as SrO, taken as NSrO (mol %), satisfying the relationship: 4NBaO≦NSrO; and
2 to 15 mol % of at least one alkali metal component selected from a sodium component, a potassium component, and a lithium component in terms of Na$_2$O, K$_2$O or Li$_2$O.

11. A spark plug comprising:
a center electrode;
a metal shell; and
an alumina ceramic insulator disposed between said center electrode and said metal shell, with at least part of the surface of said insulator being coated with a glaze layer comprising oxides,
wherein said glaze layer comprises:
1 mol % or less, in terms of PbO, of a lead component;
25 to 60 mol %, in terms of SiO$_2$, of a silicon component;
10 to 40 mol %, in terms of B$_2$O$_3$, of a boron component;
0.5 to 9.5 mol %, in terms of ZnO, of a zinc component;
0.1 mol % or more, in terms of BaO, of a barium component;
0.1 mol % or more, in terms of SrO, of a strontium component,
the total content of said barium component and said strontium component being 5 to 25 mol % in terms of the respective oxides,
the total content of said silicon component, said boron component, said zinc component, said barium component, and said strontium component being 60 to 98 mol % in terms of the respective oxides, the content of said zinc component as ZnO, taken as NZnO (mol %), the content of said barium component as BaO, taken as NBaO (mol %), and the content of said strontium component as SrO, taken as NSrO (mol %), totalizing 10 to 30 mol % and satisfying the relationship: NZnO/(NBaO+NSrO) $\leq 0.7$; and 2 to 15 mol % of at least one alkali metal component selected from a sodium component, a potassium component, and a lithium component in terms of $Na_2O$, $K_2O$ or $Li_2O$.

12. The spark plug according to claim 10 or 11, wherein said glaze layer comprises at least one of 0.5 to 10 mol %, in terms of $Al_2O_3$, of an aluminum component, 0.5 to 10 mol %, in terms of CaO, of a calcium component, and 0.5 to 10 mol %, in terms of MgO, of a magnesium component, the total content of said aluminum component, said calcium component and said magnesium component being 0.5 to 30 mol % in terms of the respective oxides.

13. The spark plug according to any one of claim 10 or 11, wherein said insulator coated with said glaze layer has an impact-resistance angle of 35° or greater, the impact-resistance angle being obtained by a pendulum impact test in which,
   (1) said spark plug is vertically fixed to a mount by means of said metal shell with the sparking tip thereof, taken as the front, inside the mount and the rear portion of the insulator projecting upright from the rear end of said metal shell,
   (2) a pendulum having a 330 mm long arm and a steel striker weighing 1.13 kg at the tip thereof is set so as to be allowed to swing on its support that is positioned above the rear end of said projecting insulator in the axial direction of said insulator at such a height that the striker strikes 1 mm vertically below the rear end of said insulator,
   (3) the pendulum is allowed to swing through a prescribed angle θ from the vertical repeatedly while increasing the angle θ stepwise by 2° until the insulator is broken, and
   (4) the critical angle θ at which the insulator is broken is taken as an impact-resistance angle.

14. A spark plug comprising:
   a center electrode;
   a metal shell; and
   an alumina ceramic insulator disposed between said center electrode and said metal shell, with at least part of the surface of said insulator being coated with a glaze layer comprising oxides,
   wherein said glaze layer comprises:
      1 mol % or less, in terms of PbO, of a lead component;
      35 to 80 mol % of a first component consisting of, based on the total glaze, 5 to 60 mol %, in terms of $SiO_2$, of a silicon component and 3 to 50 mol %, in terms of $B_2O_3$, of a boron component;
      5 to 60 mol % of a second component consisting of at least one of a zinc component and an alkaline earth metal R component (wherein R is at least one member selected from calcium, strontium, and barium), the content of said zinc component and said R component being expressed in terms of ZnO and RO, respectively,
      the total content of said first component and said second component being 65 to 98 mol %; and
      2 to 15 mol % of at least one alkali metal component selected from a sodium component, a potassium component, and a lithium component in terms of $Na_2O$, $K_2O$ or $Li_2O$,
   and said insulator coated with said glaze layer has an impact-resistance angle of 35° or greater, the impact-resistance angle being obtained by a pendulum impact test in which,
   (1) said spark plug is vertically fixed to a mount by means of said metal shell with the sparking tip thereof, taken as the front, inside the mount and the rear portion of the insulator projecting upright from the rear end of said metal shell,
   (2) a pendulum having a 330 mm long arm and a steel striker weighing 1.13 kg at the tip thereof is set so as to be allowed to swing on its support that is positioned above the rear end of said projecting insulator in the axial direction of said insulator at such a height that the striker strikes 1 mm vertically below the rear end of said insulator,
   (3) the pendulum is allowed to swing through a prescribed angle θ from the vertical repeatedly while increasing the angle θ stepwise by 2° until the insulator is broken, and
   (4) the critical angle θ at which the insulator is broken is taken as an impact-resistance angle.

15. The spark plug according to claim 11 or 14, wherein said insulator has an outwardly projecting portion on its periphery at the middle in the axial direction, the portion of said insulator which is in the rear of said projecting portion, the tip of said center electrode being taken as the front, has a cylindrical shape at the base thereof adjoining said projecting portion, and said glaze layer is formed to cover said cylindrical shape with a thickness of 7 to 50 µm.

16. The spark plug according to claim 1, 2, 7, 10, 11 or 14, wherein said glaze layer further comprises 0.5 to 5 mol % of at least one component selected from a molybdenum component, an iron component, a tungsten component, a nickel component, a cobalt component, and a manganese component, the content of said at least one component being expressed in terms of $MoO_3$, $Fe_2O_3$, $WO_3$, $Ni_3O_4$, $Co_3O_4$, and $MnO_2$.

17. The spark plug according to claim 1, 2, 7, 10, 11 or 14, wherein said glaze layer further comprises 0.5 to 5 mol % of at least one component selected from a zirconium component, a titanium, component, a magnesium component, a bismuth component, a tin component, an antimony component, and a phosphorus component, the content of said at least one component being expressed in terms of $ZrO_2$, $TiO_2$, MgO, $Bi_2O_3$, $SnO_2$, $Sb_2O_5$, and $P_2O_5$, respectively.

18. The spark plug according to claim 1, 2, 7, 10, 11 or 14, which has a coaxial terminal in a through-hole of said insulator, said terminal being an integral part of said center electrode or a separate part that is connected to said center electrode via an electrically conductive binder layer, and which has an insulation resistance of 200 MΩ or higher as measured by applying voltage between said terminal and said metal shell through said insulator while maintaining the whole spark plug at about 500° C.

19. The spark plug according to 1, 2, 7, 10, 11 or 14, wherein said alumina ceramic insulator comprises 85 to 98 mol % of an aluminum component in terms of $Al_2O_3$, and said glaze layer has a mean linear expansion coefficient of from $50 \times 10^{-7}/°$ C. to $85 \times 10^{-7}/°$ C. in a temperature range of from 20 to 350° C.

20. The spark plug according to 1, 2, 7, 10, 11 or 14, wherein said glaze layer has a softening point of 600 to 700° C.

21. A spark plug comprising:

a center electrode;

a metal shell; and an alumina ceramic insulator disposed between said center electrode and said metal shell, wherein at least part of the surface of said insulator is coated with a glaze layer comprising oxides, wherein said glaze layer comprises:

1 mol % or less, in terms of PbO, of a lead component;

35 to 80 mol % of a first component consisting of, based on the total glaze, 5 to 60 mol %, in terms of $SiO_2$, of a silicon component and 3 to 50 mol %, in terms of $B_2O_3$, of a boron component;

5 to 60 mol % of a second component consisting of at least one of a zinc component and an alkaline earth metal R component, wherein R is at least one member selected from Ca, Sr and Ba, the content of said zinc component and said R component being expressed in terms of ZnO and RO, respectively, the total content of said first component and said second component being 60 to 98 mol %;

2 to 15 mol % of at least one alkali metal component selected from a sodium component, a potassium component, and a lithium component in terms of $Na_2O$, $K_2O$ or $Li_2O$; and 0.5 to 5 mol % of at least one transition metal component selected from a molybdenum component, a tungsten component, a nickel component, a cobalt component, an iron component, and a manganese component, the content of said at least one transition metal component being expressed in terms of $MoO_3$, $WO_3$, $Ni_3O_4$, $Co_3O_4$, $Fe_2O_3$ and $MnO_2$.

22. The spark plug according to claim 21, wherein the molar ratio of the silicon component content ($NSiO_2$) to the boron component content ($NB_2O_3$) in terms of the respective oxides is from 0.5 to 1.5, and the molar ratio of the alkaline earth metal R component content (NRO) to the boron component content ($NB_2O_3$) in terms of the respective oxides is from 0.1 to 0.25.

23. The spark plug according to claim 21, wherein said glaze layer comprises, in terms of said respective oxides, 15 to 60 mol % of said Si component, 10 to 50 mol % of said boron component, 0.5 to 25 mol % of said zinc component, and 5 to 25 mol % of a barium component.

24. The spark plug according to claim 23, wherein said glaze layer comprises, in terms of said respective oxides, 15 to 29.5 mol % of said silicon component and 25 to 50 mol % of said boron component.

25. The spark plug according to claim 21, wherein said glaze layer comprises at least one of 0.5 to 10 mol %, in terms of $Al_2O_3$, of an aluminum component, 0.5 to 10 mol %, in terms of CaO, of a calcium component, and 0.5 to 30 mol %, in terms of SrO, of a strontium component, the total content of said aluminum component, said calcium component and said strontium component being 0.5 to 30 mol % in terms of the respective oxides.

26. The spark plug according to claim 21, wherein said glaze layer further comprises 5 mol % or less, in total, of one or more of a zirconium component, a titanium component, a magnesium component, a bismuth component, a tin component, an antimony component, and a phosphorus component in terms of $ZrO_2$, $TiO_2$, MgO, $Bi_2O_3$, $SnO_2$, $Sb_2O_5$, and $P_2O_5$, respectively.

27. The spark plug according to claim 21, which has a coaxial terminal in a through-hole of said insulator, said terminal being an integral part of said center electrode or a separate part that is connected to said center electrode via an electrically conductive binder layer, and which has an insulation resistance of 200 MΩ or higher as measured by applying voltage between said terminal and said metal shell through said insulator while maintaining the whole spark plug at about 500° C.

28. The spark plug according to claim 21, wherein said alumina ceramic insulator comprises 85 to 98 mol % of an aluminum component in terms of $Al_2O_3$, and said glaze layer has a mean linear expansion coefficient of from $50 \times 10^{-7}$/° C. to $85 \times 10^{-7}$/° C. in a temperature range of from 20 to 350° C.

29. The spark plug according to claim 21, wherein said glaze layer has a softening point of 600 to 700° C.

* * * * *

UNITED STATES PATENT AND TRADEMARK OFFICE
CERTIFICATE OF CORRECTION

PATENT NO.    : 6,590,318 B2
DATED         : July 8, 2003
INVENTOR(S)   : Kenichi Nishikawa et al.

It is certified that error appears in the above-identified patent and that said Letters Patent is hereby corrected as shown below:

<u>Title page,</u>
Insert item -- [30] Foreign Application Priority Data
        February 29, 2000    [JP]    Japan............2000-54512
        February 29, 2000    [JP]    Japan............2000-54513
        July 31, 2000    [JP]    Japan............2000-232506. --

Signed and Sealed this

Twenty-seventh Day of April, 2004

JON W. DUDAS
*Acting Director of the United States Patent and Trademark Office*